(12) United States Patent
Nomura et al.

(10) Patent No.: US 8,602,859 B2
(45) Date of Patent: Dec. 10, 2013

(54) VIDEO GAME DEVICE, VIDEO GAME IMPLEMENTATION METHOD AND PROGRAM

(75) Inventors: Tetsuya Nomura, Tokyo (JP); Hajime Tabata, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1619 days.

(21) Appl. No.: 11/854,727

(22) Filed: Sep. 13, 2007

(65) Prior Publication Data

US 2008/0254849 A1  Oct. 16, 2008

(30) Foreign Application Priority Data

Sep. 21, 2006  (JP) ................. P2006-256478

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ............................................................. 463/9

(58) Field of Classification Search
USPC ................................................................ 463/9
See application file for complete search history.

(56) References Cited

FOREIGN PATENT DOCUMENTS

JP  2000-093647  4/2000

OTHER PUBLICATIONS

Marit Celaire, GameFAQs: Magical Tetris Challenge (N64), May 30, 2004, <http://www.gamefaqs.com/n64/197844-magical-tetris-challenge/faqs/27801 >.*
Lauren Fielder, GameSpot: Magical Tetris Challenge Review, Nov. 18, 1998, <http://www.gamespot.com/magical-tetris-challenge/reviews/magical-tetris-challenge-review-2544706?tag=summary%3Bread-review>.*
English language Abstract of JP 2000-093647.

* cited by examiner

*Primary Examiner* — Melba Bumgarner
*Assistant Examiner* — Jason Pinheiro
(74) *Attorney, Agent, or Firm* — Greenblum & Bernstein, P.L.C.

(57) ABSTRACT

To reflect a player's degree of skill in a battle between a player character and an enemy character, and increase a strategic element. In the event that a player selects magic as an action of a player character in a battle between a player character and an enemy character, a puzzle battle is started. In the puzzle battle, a magic army (a block frame) is displayed on a display device in accordance with a kind of magic selected, the player moves or rotates a block falling from above the display device by operating an input device, stops it in a desired position, and fills the magic army. In the event that all squares of the magic army are filled with the blocks before a time elapsing from a start of the puzzle battle, displayed on an elapsed time gauge, reaches a prescribed time, the magic selected by the player is unleashed, and inflicts damage on the enemy character. An effectiveness of the magic depends on an overlapping, and a protrusion from the magic army, of the blocks.

21 Claims, 7 Drawing Sheets

FIG. 2A

| PLAYER CHARACTER NAME | HP | HPmax | MP | MPmax | Lv | Ev | WEAPON | PROTECTIVE EQUIPMENT | ITEM 1 | ---- | ITEM M |
|---|---|---|---|---|---|---|---|---|---|---|---|
| 201 | 202a | 202b | 203a | 203b | 204 | 205 | 206 | 207 | \{ 208 | | \} |

| | APPEARANCE PLACE | HP | HPmax | MP | MPmax | ATTRIBUTE | ATTACKING STRENGTH | DEFENSIVE STRENGTH | END |
|---|---|---|---|---|---|---|---|---|---|
| EC1 | APPEARANCE PLACE | HP | HPmax | MP | MPmax | ATTRIBUTE | ATTACKING STRENGTH | DEFENSIVE STRENGTH | END |
| EC2 | APPEARANCE PLACE | HP | HPmax | MP | MPmax | ATTRIBUTE | ATTACKING STRENGTH | DEFENSIVE STRENGTH | END |
| ---- | ---- | ---- | ---- | ---- | ---- | ---- | ---- | ---- | ---- |
| ECn | APPEARANCE PLACE | HP | HPmax | MP | MPmax | ATTRIBUTE | ATTACKING STRENGTH | DEFENSIVE STRENGTH | END |
| 211 | 212 | 213a | 213b | 214a | 214b | 215 | 216 | 217 | 218 |

210

FIRE (FIRE)           FIRER (FIRE)
COMET (EARTH)         COMETEO (EARTH)
BLIZZARD (WATER)      BLIZZARER (WATER)
THUNDER (THUNDER)     THUNDERER (THUNDER)

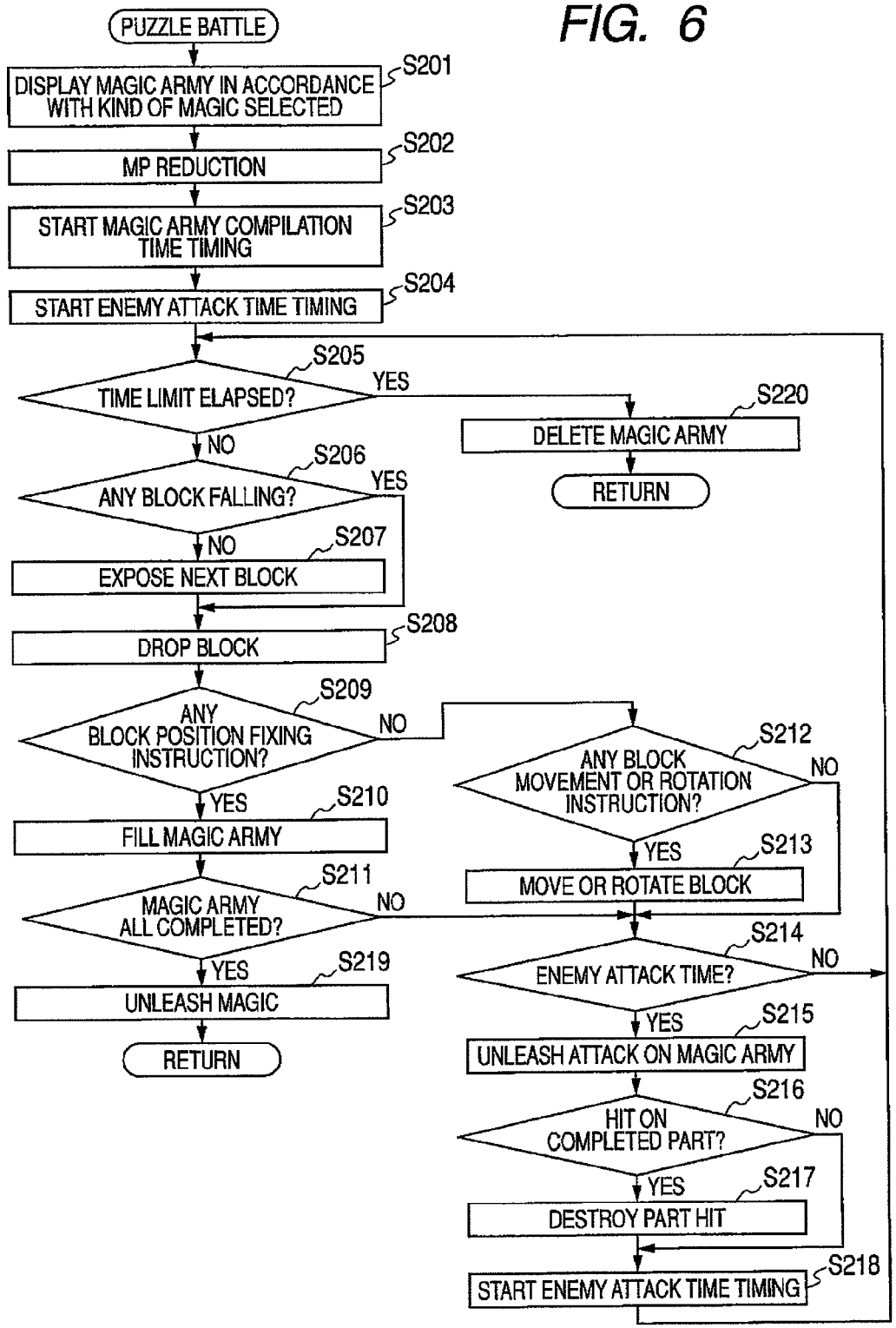

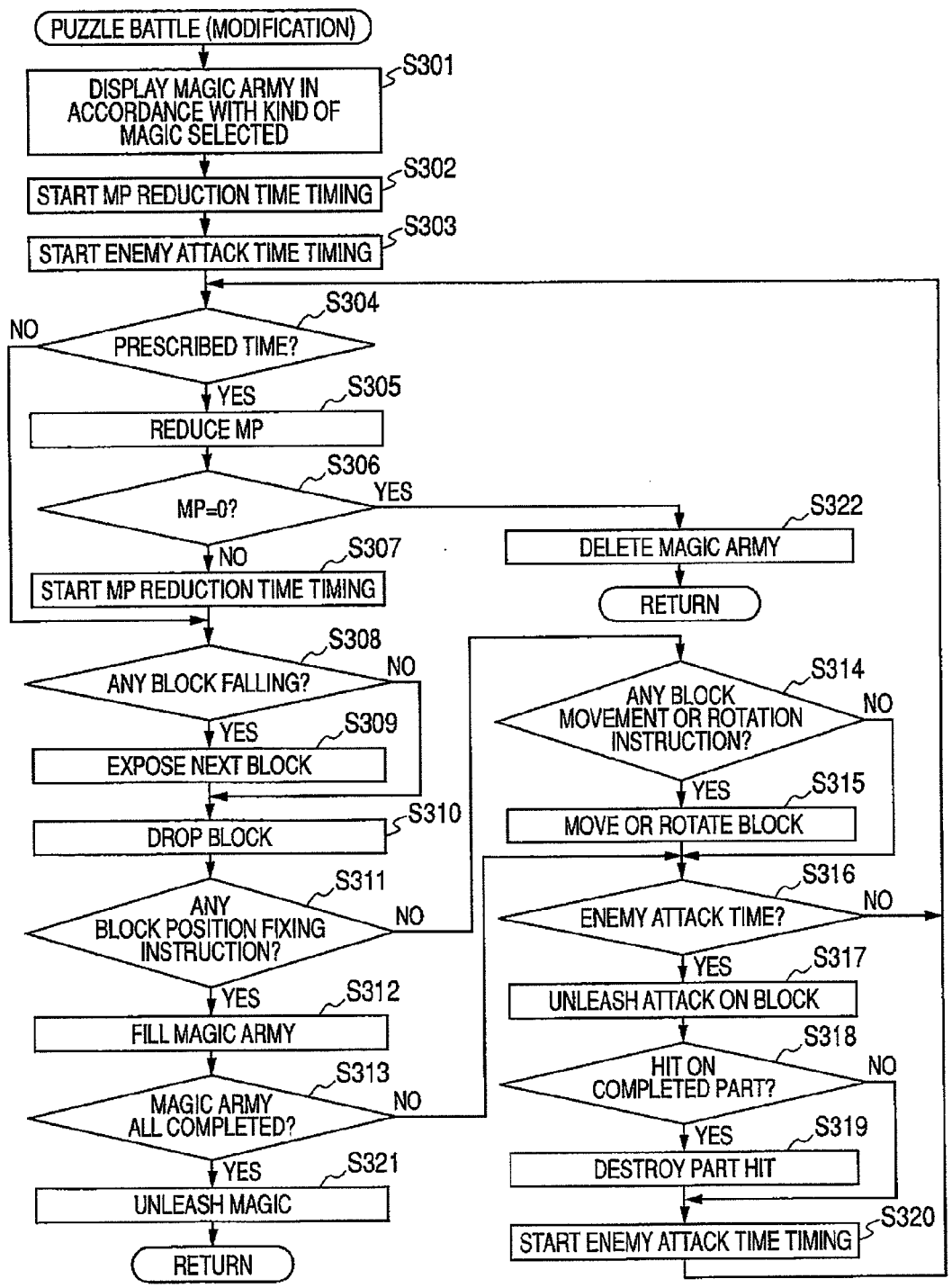

VIDEO GAME DEVICE, VIDEO GAME IMPLEMENTATION METHOD AND PROGRAM

CROSS REFERENCE TO RELATED APPLICATION

The present disclosure relates to subject matter contained in Japanese Patent Application No. 2006-256478, filed on Sep. 21, 2006, the disclosure of which is expressly incorporated herein by reference in its entirety.

BACKGROUND OF THE INVENTION

1. Field of the Invention

The present invention relates to a video game including a battle between a player character, which operates in accordance with an instruction from a player, and an enemy character.

2. Related Art

To date, a variety of categories of game in a video game field have been known. Among them, a game which receives support from a large number of users is a role playing game (hereafter referred to as an RPG). In the RPG, the game is implemented by a player assuming a role of a player character in a hypothetical world and, while moving the player character in a hypothetical space, using various items to solve a task. A main task given to the player in the RPG is a battle between the player character and the enemy character. Also, among adventure games (hereafter referred to as ADG)) too, there is one in which a battle similar to that of the RPG is carried out.

As an attack method of the player character against the enemy character during the battle in the RPG or ADG, there is, for example, a simple attack with a weapon with which the player character is equipped, an attack using an item which the player character owns, an attack with magic which can be unleashed depending on an attribute etc. of the player character, and the like. However, all of the attack methods being commonplace as the attack method of the player character in the battle of the RPG, and an effect inflicted on the enemy character due to a selected attack being more or less determined, a player's degree of skill has been little reflected in a result of the game.

In connection with this, although there is no game with a story element like the RPG and ADG, as games in the video game field in which the player's degree of skill is clearly reflected in the result of the game, there are a racing game and a puzzle game. By incorporating an element of this kind of game, in which the player's degree of skill is reflected, in the game with the story element like the RPG and ADG, it is possible to increase a variety of the game like the RPG and ADG. Herein, there has been a video game incorporating the racing game in place of a normal battle between the player character and the enemy character (for example, refer to Patent Document JP-A-10-267674).

A race incorporated in place of the battle in the video game of Patent Document JP-A-10-267674, from a point of being a contest between an own car (corresponding to the player character), which runs in accordance with an operation of the player, and an opponent car (corresponding to the enemy character), which runs in accordance with a control of a game device, has a commonality with the battle, which is a contest between the player character, which acts in accordance with an operation of the player, and the enemy character, which acts in accordance with a control of a game device. Consequently, it has been possible to incorporate the racing game, as it is, in place of the battle in the RPG and ADG.

In connection with this, although the puzzle game has a commonality with the racing game from a point of being a game in which the player's degree of skill is clearly reflected in the result, it is not a game which includes an element of the contest between the player character and the enemy character as in the battle of the RPG and ADG. Consequently, to date, even in a case of incorporating the element of the puzzle game in the RPG, it has been incorporated as a completely separate task from the battle, rather than incorporated as the main task given to the player. For this reason, even though the element of the puzzle game is incorporated in the RPG and ADG, it has not happened that a degree of skill with which the player plays the puzzle game is reflected in the battle.

SUMMARY OF THE INVENTION

The invention has an object of providing a video game device and the like which, in the video game including the battle between the player character and the enemy character, can reflect the player's degree of skill in the relevant battle, and increase the strategic element.

In order to achieve the heretofore described object, a video game device according to a first aspect of the invention, for executing a game, including a battle between a player character and a enemy character, and that progresses in accordance with an instruction from a player, the video game device displays an image of the game being executed on a display, includes: a survival capability value storage that stores, for each of the player character and the enemy character, a survival capability value which, by being reduced to a prescribed survival impossibility value, entails a defeat in the battle; a puzzle frame displayer that displays a puzzle frame configured of a plurality of squares on the display during an implementation of the battle; a block exposer that, while the puzzle frame is being displayed, causes blocks of fewer squares than a quantity of squares configuring the puzzle frame to sequentially appear on the display; a block mover that, in accordance with an instruction from the player, moves the blocks sequentially exposed by the block exposer that, fills the squares of the puzzle frame, and displays them on the display; an elapsed timer that which times a time elapsed from a time when the puzzle frame is displayed by the puzzle frame displayer unit, or from a time from a first block is exposed by the block exposing unit exposer; and an enemy survival capability value reducer that, in accordance with the squares of the puzzle frame filled with the blocks before the elapsed time timer times a predetermined time limit, reduces the survival capability value of the enemy character stored in the survival capability value storage.

In the video game device according to the heretofore described first aspect, the puzzle frame configured of the plurality of squares is displayed on the display during the implementation of the battle between the player character and the enemy character, and furthermore, the blocks are sequentially exposed. The exposed blocks are moved in accordance with the instruction from the player, by which means it is possible to fill the squares of the puzzle frame. Herein, whether or not the squares of the puzzle frame are efficiently filled with the exposed blocks is largely dependent on the player's degree of skill.

In the battle of the game, the survival capability value of the enemy character is reduced in accordance with the squares of the puzzle frame filled with the blocks exposed before the time elapsed from the display of the puzzle frame, or the appearance of the first block, reaches the time limit. In order to obtain a result which is a victory of the player character in the battle, it is necessary to reduce the survival capability value of the enemy character as far as possible, but as the player's degree of skill plays a large part in this, the strategic element of the battle is high.

Also, although many of this kind of game including the battle between the player character and the enemy character are games with a story aspect, such as an RPG or ADG, to date, in an attack by the player character against the enemy character during the battle, the player's degree of skill has been little reflected in a result. In connection with this, even in the event that the game executed in the heretofore described video game device is a game such as the RPG or ADG, as an element of a puzzle game, in a result of which the player's degree of skill is clearly reflected, is herein incorporated in the battle between the player character and the enemy character, it is possible to increase a variety of the game.

In the video game device according to the heretofore described first aspect, although it is acceptable that a time interval at which the block exposing unit sequentially exposes the blocks is a regular interval, it is also acceptable that it is an irregular interval. In the case of exposing the blocks at the irregular interval, it is acceptable to either regularly change the time interval at which the block exposing unit sequentially exposes the blocks, or to randomly change the time interval for sequentially exposing the blocks. It is also acceptable that the time interval at which the block exposing unit sequentially exposes the blocks changes in accordance with the exposed blocks. Also, it is sufficient that the time limit is set at a time longer than a time between appearances of the blocks (in the case in which the block exposing unit sequentially exposes the blocks at the irregular intervals, a longest among them). Furthermore, the enemy survival capability value reducer reducing the survival capability value of the enemy character meaning that it updates the relevant survival capability value so that it approaches the prescribed survival impossibility value, it does not necessarily make the value smaller.

In the video game device according to the heretofore described first aspect, it is also possible to arrange that, in the event that not all the squares of the puzzle frame have been filled with the blocks before the elapsed time timer reaches the time limit, the enemy survival capability value reducer does not reduce the survival capability value of the enemy character.

It is also possible to arrange that, again, in the event that not all the squares of the puzzle frame have been filled with the blocks before the elapsed time timer reaches the time limit, the enemy survival capability value reducer decreases a reduction amount of the survival capability value of the enemy character in accordance with the squares of the relevant puzzle frame which have not been filled.

In the former case, as the survival capability value of the enemy character is not reduced in the event that not all the squares of the puzzle frame are filled before the time limit, a difference in the players' degree of skill is clearly reflected in the result of the battle. Contrarily, in the latter case, even in the event that not all the squares of the puzzle frame are filled before the time limit, as it is possible to reduce the survival capability value of the enemy character by a certain amount in accordance with the squares filled, it is possible for even a player who does not have a very high degree of skill to sufficiently enjoy a process of the battle between the player character and the enemy character.

It is possible to arrange that the video game device according to the heretofore described first aspect further includes a time limit case player survival capability value reducer that, in the event that not all the squares of the puzzle frame have been filled with the blocks before the elapsed time timer reaches the time limit, reduces the survival capability value of the player character stored in the survival capability value storage, in accordance with the squares of the relevant puzzle frame which have not been filled.

In this case, as the survival capability value of the player character is reduced in the event that not all the squares of the puzzle frame are filled before the time limit, a difference in players' degree of skill is clearly reflected in the result of the battle.

In order to achieve the heretofore described object, a video game device according to a second aspect of the invention which, executing a game including a battle between a player character and an enemy character, that progress in accordance with an instruction from a player, and displays an image of the game being executed on a display, the video game machine includes: a survival capability value storage that stores, for each of the player character and the enemy character, a survival capability value which, by being reduced to a prescribed survival impossibility value, entails a defeat in the battle; an attacking capability value storage which stores, for the player character, an attacking capability value which, by being reduced to a prescribed attacking limit value, entails an attack against the enemy character being limited; a puzzle frame displayer which displays a puzzle frame configured of a plurality of squares on the display device during an implementation of the battle; a block exposure which, while the puzzle frame is being displayed on the display, causes blocks configured of fewer squares than a quantity of squares configuring the puzzle frame to sequentially appear on the display; a block moving unit which, in accordance with an instruction from the player, moves the blocks sequentially exposed by the block exposing unit exposure, fills the squares of the puzzle frame, and displays them on the display; an attacking capability value reducer which sequentially reduces the attacking capability value of the player character, in accordance with a time elapsed from the puzzle frame being displayed by the puzzle frame displayer, or from a first block being exposed by the block exposure; and an enemy survival capability value reducer that, in accordance with the squares of the puzzle frame filled with the blocks before the attacking capability value is reduced to the prescribed attacking limit value, reduces the survival capability value of the enemy character stored in the survival capability value storage.

In the video game device according to the heretofore described second aspect, the puzzle frame configured of the plurality of squares is displayed on the display during the implementation of the battle between the player character and the enemy character, and furthermore, the blocks are sequentially exposed. The exposed blocks are moved in accordance with the instruction from the player, by which means it is possible to fill the squares of the puzzle frame. Herein, whether or not the squares of the puzzle frame are efficiently filled with the exposed blocks is largely dependent on the player's degree of skill.

In the battle of the game, the survival capability value of the enemy character is reduced in accordance with the squares of the puzzle frame filled with the blocks exposed before the attacking capability value of the player character is reduced to the prescribed attacking limit value. Also, even in the event that all the squares of the puzzle frame are filled with the blocks exposed before the attacking capability value of the player character is reduced to the attacking limit value, in order to minimize the reduction of the attacking capability value, it is preferable to fill the squares of the puzzle frame in as short a time as possible. In order to obtain a result which is a victory of the player character in the battle, it is necessary to reduce the survival capability value of the enemy character as far as possible, and, it being necessary to minimize the reduction of the attacking capability value even when obtaining the result which is the victory of the player character, as the player's degree of skill plays a large part in this, the strategic element of the battle is high.

Also, although many of this kind of game including the battle between the player character and the enemy character are games with a story aspect, such as an RPG or ADG, to date, in the attack by the player character against the enemy character during the battle, the player's degree of skill has been little reflected in the result. In connection with this, even in the event that the game executed in the heretofore described video game device is the game such as the RPG or ADG, as the element of the puzzle game, in the result of which the player's degree of skill is clearly reflected, is herein incorporated in the battle between the player character and the enemy character, it is possible to increase the variety of the game.

In the video game device according to the heretofore described second aspect, although it is acceptable that the time interval at which the block exposure sequentially exposes the blocks is a regular interval, it is also acceptable that it is an irregular interval. In the case of exposing the blocks at the irregular interval, it is acceptable to either regularly change the time interval at which the block exposure sequentially exposes the blocks, or to randomly change the time interval for sequentially exposing the blocks. It is also acceptable that the time interval at which the block exposing unit sequentially exposes the blocks changes in accordance with the exposed blocks. Also, it is acceptable that the time limit is set at a time longer than the time between the appearances of the blocks (in the case in which the block exposure sequentially exposes the blocks at the irregular intervals, a longest among them). Also, the attacking capability value reducer sequentially reducing the attacking capability value of the player character meaning that it updates the relevant attacking capability value so that it approaches the prescribed attacking limit value, it does not necessarily make the value smaller. Furthermore, the enemy survival capability value reducer reducing the survival capability value of the enemy character meaning that it updates the relevant survival capability value so that it approaches the prescribed survival impossibility value, it does not necessarily make the value smaller.

In the video game device according to the heretofore described second aspect, it is also possible to arrange that, in the event that not all the squares of the puzzle frame have been filled before the attacking capability value is reduced to the prescribed attacking limit value by the attacking capability value reducer, the enemy survival capability value reducer does not reduce the survival capability value of the enemy character.

It is also possible to arrange that, again, when all of the squares of the puzzle frame have not been filled with the blocks before the attacking capability value is reduced to the prescribed attacking limit value by the attacking capability value reducer, the enemy survival capability value reducer decreases a reduction amount of the survival capability value of the enemy character in accordance with the squares of the relevant puzzle frame which have not been filled.

In the former case, as the survival capability value of the enemy character is not reduced when all of the squares of the puzzle frame are filled before the attacking capability value of the player character decreases to the prescribed attacking limit, the difference in the players' degree of skill is clearly reflected in the result of the battle. Contrarily, in the latter case, even in the event that not all the squares of the puzzle frame are filled before the time limit, as it is possible to reduce the survival capability value of the enemy character by a certain amount in accordance with the squares filled, it is possible for even a player who does not have a very high degree of skill to sufficiently enjoy the process of the battle between the player character and the enemy character.

It is possible to arrange that the video game device according to the heretofore described second aspect further includes a player survival capability value reducer which, in the event that not all the squares of the puzzle frame have been filled with the blocks before the attacking capability value is reduced to the prescribed attacking limit value by the attacking capability value reducer, reduces the survival capability value of the player character stored in the survival capability value storage, in accordance with the squares of the relevant puzzle frame which have not been filled.

In this case, as the survival capability value of the player character is reduced when all of the squares of the puzzle frame are filled before the attacking capability value of the player character decreases to the prescribed attacking limit, the difference in the players' degree of skill is clearly reflected in the result of the battle.

It is also acceptable that the video game device according to the heretofore described second aspect further includes: an item acquisition unit which, during an implementation of the game, acquires an item for raising the attacking capability value of the player character; and an attacking capability value raiser which, in a case in which the item has been acquired by the item acquisition unit, uses the item in accordance with an instruction from the player, and raises the attacking capability value of the player character. In this case, the attacking capability value raiser, in a case in which the puzzle frame is being displayed by the puzzle frame displayer too, raises the attacking capability value of the player character in accordance with the instruction from the player before the attacking capability value is reduced to the prescribed attacking limit value.

Herein, when the player possesses the item for raising the attacking capability value, it is possible to use this to restore the attacking capability value, which has been reduced since the display of the puzzle frame or the appearance of the first block. For this reason, as a likelihood of increasing the quantity of squares which can be filled with the sequentially exposed blocks, and of being able to fill all the squares of the puzzle frame, increases, it is possible to further increase the variety of the game in the battle, and for the player who does not have a very high degree of skill to also sufficiently enjoy the process of the battle.

In the video game device according to the heretofore described first and second aspects, it is acceptable that the block mover, when a block configured of a plurality of squares is exposed by the block exposing unit, can move the relevant exposed block in such a way that some squares, among the relevant plurality of squares, fill the puzzle frame, and some other squares protrude from the puzzle frame.

In this case, it can be arranged in such a way that the enemy survival capability value reducer, in a case in which there is the block moved by the block mover in such a way that some of the squares protrude from the puzzle frame, reduces the reduction amount of the survival capability value of the enemy character in accordance with the relevant protruding squares.

Also, in this case, it can be arranged in such a way that the video game device according to the heretofore described first and second aspects further includes a protrusion case player survival capability value reducer that, in the case in which there is the block moved by the block moving unit in such a way that some of the squares protrude from the puzzle frame, reduces the survival capability value of the player character stored in the survival capability value storage, in accordance with the squares protruding from the relevant puzzle frame.

By arranging that it is acceptable that some of the squares protrude from the puzzle frame in this way, it being possible to easily fill the squares of the puzzle frame, it is possible for the player who does not have a particularly high degree of skill to also sufficiently enjoy the process of the battle. Contrarily, by decreasing the reduction amount of the survival capability value of the enemy character, and reducing the survival capability value of the player character, in accordance with the squares protruding from the puzzle frame, it is possible to reflect the difference in the players' degree of skill in the result of the battle.

In the video game device according to the heretofore described first and second aspects, it is acceptable that the block moving unit can move different blocks sequentially exposed by the block exposing unit in such a way that squares configuring the exposed blocks overlap and fill the puzzle frame.

In this case, it can be arranged in such a way that the enemy survival capability value reducer, in a case in which the squares of the different blocks are overlapping and filling the puzzle frame due to the block moving unit, reduces the reduction amount of the survival capability value of the enemy character in accordance with the relevant overlapping squares.

Also, in this case, it can be arranged in such a way that the video game device according to the heretofore described first and second aspects further includes an overlapping case player survival capability value reducer that, in the case in which the squares of the different blocks are overlapping and filling the puzzle frame due to the block mover, reduces the survival capability value of the player character stored in the survival capability value storage, in accordance with the relevant overlapping squares.

By arranging that it is acceptable that the squares of the different blocks are overlapping and filling the puzzle frame in this way, it being possible to easily fill the squares of the puzzle frame, it is possible for the player who does not have a particularly high degree of skill to also sufficiently enjoy the process of the battle. Contrarily, by decreasing the reduction amount of the survival capability value of the enemy character, and reducing the survival capability value of the player character, in accordance with the squares where the blocks have overlapped, it is possible to reflect the difference in the players' degree of skill in the result of the battle.

It is also acceptable that it is impossible for the block moving unit to move the block exposed by the block exposure in such a way that some of the squares thereof protrude from the puzzle frame, or to fill with the relevant exposed block so as to fill the puzzle frame in such a way that squares of different blocks overlap. It is also acceptable that a block which has been unable to fill the puzzle frame without any square protruding, and a block which has been unable to fill the puzzle frame without overlapping with a square of another block, should be destroyed.

Also, it is also acceptable that even a block which can fill the puzzle frame without any square protruding, and a block which can fill the puzzle frame without overlapping with a square of another block, can be destroyed in accordance with an instruction from the player. It is also acceptable that, even in a case in which some of the squares protruding from the puzzle battle, or the squares of different blocks overlapping, is permitted, it is possible to destroy the exposed block in accordance with an instruction from the player.

In the video game device according to the heretofore described first and second aspects, it can be arranged in such a way that the puzzle frame displayer displays on the display one puzzle frame from among a plurality of puzzle frames, mutually differing in a quantity of configuring squares and/or a combination shape of the squares, a degree of complexity of which is fixed by the relevant quantity of squares and/or the combination shape, and the enemy survival capability value reducer reduces the survival capability value of the enemy character in accordance with the degree of complexity of the puzzle frame displayed by the puzzle frame displayer.

By the plurality of puzzle frames, the degree of complexity of which is fixed by the quantity of squares and/or the combination shape, being prepared in this way, a game aspect of filling the puzzle frame with the exposed blocks becoming diverse, it is possible to further increase the variety of the game. Also, as the survival capability value of the enemy character is reduced in accordance with the degree of complexity of the puzzle frame, it is possible to reflect the difference in the players' degree of skill in the result of the battle.

Herein, it can be arranged in such a way that the video game device according to the heretofore described first and second aspects further including a puzzle frame selection unit which selects the degree of complexity of the puzzle frame to be displayed on the display, in accordance with an instruction from the player, the puzzle frame displayer displays the puzzle frame of the degree of complexity selected by the puzzle frame selection unit on the display.

By arranging in such a way that the player can personally select the degree of complexity of the puzzle frame, and implement the game using the puzzle frame of the personally selected degree of difficulty in this way, it is possible for both the player with a high degree of skill and the player with a low degree of skill to enjoy the battle using the element of the puzzle game, which involves filling the puzzle frame with the blocks, in accordance with their respective degree of skill.

It is acceptable that the video game device according to the heretofore described first and second aspects further includes an attack method selection unit which, in accordance with an instruction from the player, selects a desired attack method from among a plurality of kinds of attack method, including the display of the puzzle frame and the movement of the block, fixed as attack methods of the player character against the enemy character for reducing the survival capability value of the enemy character in the battle. In this case, it can be arranged that the puzzle frame displayer, when the display of the puzzle frame and the movement of the block have been selected as the attack methods against the enemy character by the attack method selection unit, displays the puzzle frame on the display.

In this case, as it is left to a choice of the player whether or not to carry out the attack against the enemy character by the display of the puzzle frame and the movement of the blocks, it being unlikely to happen that the player character is completely unable to beat the enemy character, even a player who is inept at the puzzle game-type game which involves filling the squares of the displayed puzzle frame with the sequentially exposed blocks can enjoy the game.

It can be arranged in such a way that the video game device according to the heretofore described first and second aspects further includes a block elimination unit which, when a prescribed condition has been fulfilled in a condition in which the puzzle frame is being displayed on the display, eliminates a part or a whole of the block which has been moved by the block mover, and is filling the squares of the relevant puzzle frame.

Herein, as it can happen that, even though the player fills the squares of the puzzle frame with the blocks, the whole or a part thereof is made to disappear, the strategic element of the game in the battle further increases, and it is possible to further raise the variety of the game.

That the block elimination unit eliminates the whole of the block means that all of the squares, among the squares of the puzzle frame, which have been filled with the block can be returned to a condition in which they are not filled with any block. Meanwhile, that the block elimination unit eliminates a part of the block can mean either that squares, among the squares of the puzzle frame, which have been filled with a specified block are returned to a condition in which they are not filled with any block (that is, they are eliminated in a unit of a block exposed by the block exposing unit), or that some squares, among the squares of the puzzle frame, which have been filled with any block are returned to a condition in which they are not filled with any block (that is, they are eliminated in a unit of a square of the block).

Herein, it can be arranged in such a way that the video game device according to the heretofore described first and second aspects further includes an enemy character action unit which, every time a prescribed enemy action condition is fulfilled during the battle, decides an action of the enemy character, including an attack against the player character and the elimination of the part or the whole of the block, and causes the enemy character to carry out the relevant decided action, in which case the block elimination unit, when the elimination of the part or the whole of the block is decided by the enemy character action unit as the action of the enemy character, causes the part or the whole of the block filling the squares of the puzzle frame to disappear as a result of the action of the enemy character.

In this case, as a part or the whole of the block which has once filled the squares of the puzzle frame as the attack of the enemy character during the battle is made to disappear, the element of the battle between the player character and the enemy character is not lost, even while the puzzle frame is being displayed, and the squares of the puzzle frame are being filled with the sequentially exposed blocks.

It is acceptable to arrange in such a way that the prescribed enemy action condition, which causes the enemy character to act, is more difficult to fulfill when the puzzle frame is being displayed on the display compared with when the relevant puzzle frame is not being displayed. For example, in the case in which the enemy action condition is fulfilled at the prescribed time interval when the puzzle frame is not being displayed, it is acceptable that the enemy action condition is fulfilled at a time interval longer than the relevant prescribed time interval when the relevant puzzle frame is being displayed. Also, it is also acceptable that the enemy character action unit, when the puzzle frame is being displayed on the display, can cause only the elimination of a part or the whole of the block to be carried out as the action of the enemy character.

It is acceptable, in the video game device according to the heretofore described first and second aspects, that one or more random attributes, from among a predetermined plurality of kinds of attribute, are appended to each of the blocks sequentially exposed by the block exposure. In this case, it can be arranged that the enemy survival capability value reducer reduces the survival capability value of the enemy character stored in the survival capability value storage in accordance with the attribute appended to the block filling the squares of the puzzle frame.

In this case, the game aspect not stopping at simply filling the squares of the puzzle frame with the blocks, as the player's choice extends as far as deciding the block endowed with which attribute to fill the squares of the puzzle frame with, as well as being possible to further increase the variety of the game, it is possible to more clearly reflect the difference in the players' degree of skill in the result of the battle.

In a case in which there is a plurality of kinds of enemy character carrying out the battle with the player character, it is acceptable that an attribute is fixed for each enemy character by which the survival capability value is easily reduced or is difficult to reduce. In this case, the enemy survival capability value reducer can reduce the survival capability value of the relevant enemy character, in accordance with the attribute appended to the block which has filled the squares of the puzzle frame, and the attribute fixed for the enemy character carrying out the battle.

In order to achieve the heretofore described object, a video game implementation method according to a third aspect of the invention which, being executed in a computer device, implements a game including a battle between a player character and an enemy character, that progresses in accordance with an instruction from a player, and displays an image of the game being executed on a display which the relevant computer device includes, includes: storing in a memory which the computer device the video game device includes, for each of the player character and the enemy character, before the battle starts, a survival capability value which, by being reduced to a prescribed survival impossibility value, entails a defeat in the battle; displaying a puzzle frame configured of a plurality of squares on the display during an implementation of the battle; sequentially exposing, while the puzzle frame is being displayed on the display, blocks of fewer squares than a quantity of squares configuring the puzzle frame on the display; moving the sequentially exposed blocks on the display, filling the squares of the puzzle frame, and displaying them on the display, in accordance with an instruction which the player has input from a display which the computer device includes; timing a time elapsed from the puzzle frame being displayed, or from a first block being exposed, by means of a timing device which the computer device includes; and reducing the survival capability value of the enemy character stored in the memory in accordance with the squares of the puzzle frame filled with the blocks before a predetermined time limit elapses.

In order to achieve the heretofore described object, a video game implementation method according to a fourth aspect of the invention which, being executed in a computer device, implements a game including a battle between a player character and an enemy character, that progresses in accordance with an instruction from a player, and an enemy character, and displays an image of the game being executed on a display that the relevant computer device includes, includes: storing in a memory which the computer device includes, for each of the player character and the enemy character, before the battle starts, a survival capability value which, by being reduced to a prescribed survival impossibility value, entails a defeat in the battle; storing in the memory, for the player character, before the battle starts, an attacking capability value which, by being reduced to a prescribed attacking limit value, entails an attack against the enemy character being limited; displaying a puzzle frame configured of a plurality of squares on the display during an implementation of the battle; sequentially exposing, while the puzzle frame is being displayed on the display, blocks configured of fewer squares than a quantity of squares configuring the puzzle frame on the display; moving the sequentially exposed blocks on the display, filling the squares of the puzzle frame, and displaying them on the display device, in accordance with an instruction which the player has input from a display device which the computer device includes; sequentially reducing the attacking capability value of the player character stored in the memory, in accordance with a time elapsed from the puzzle frame being displayed, or from a first block being exposed; and reducing the survival capability value of the enemy character stored in the memory, in accordance with the squares of the puzzle frame filled with the blocks before the attacking capability value is reduced to the prescribed attacking limit value.

In order to achieve the heretofore described object, a program according to a fifth aspect of the invention, for executing a game including a battle between a player character, that progresses in accordance with an instruction from a player, and an enemy character in a computer device, and displaying an image of the game being executed on a display, causes the computer device to function as: a survival capability value storage unit which stores, for each of the player character and the enemy character, a survival capability value which, by being reduced to a prescribed survival impossibility value, entails a defeat in the battle, in a memory which the computer device includes; a puzzle frame displayer which displays a puzzle frame configured of a plurality of squares on the display during an implementation of the battle; a block exposing unit which, while the puzzle frame is being displayed on the display device, causes blocks of fewer squares than a quantity of squares configuring the puzzle frame to sequentially appear on the display; a block mover which, in accordance with an instruction from the player, moves the blocks sequentially exposed by the block exposure on the display, fills the squares of the puzzle frame, and displays them on the display; an elapsed time timer which times a time elapsed from the puzzle frame being displayed by the puzzle frame display, or from a first block being exposed by the block exposure; and an enemy survival capability value reducer which, in accordance with the squares of the puzzle frame filled with the blocks before the elapsed time timer reaches a predetermined time limit, reduces the survival capability value of the enemy character stored in the survival capability value storage.

In order to achieve the heretofore described object, a program according to a sixth aspect of the invention, for executing a game including a battle between a player character and an enemy character, that progresses in accordance with an instruction from a player, in a computer device, and displaying an image of the game being executed on a display, causes the computer device to function as: a survival capability value storage that stores, for each of the player character and the enemy character, a survival capability value which, by being reduced to a prescribed survival impossibility value, entails a defeat in the battle, in a memory which the computer device includes; an attacking capability value storage that stores in the memory, for the player character, an attacking capability value which, by being reduced to a prescribed attacking limit value, entails an attack against the enemy character being limited; a puzzle frame displayer which displays a puzzle frame configured of a plurality of squares on the display during an implementation of the battle; a block exposure that, while the puzzle frame is being displayed on the display, causes blocks configured of fewer squares than a quantity of squares configuring the puzzle frame to sequentially appear on the display device; a block moving unit which, in accordance with an instruction from the player, moves the blocks sequentially exposed by the block exposure on the display device, fills the squares of the puzzle frame, and displays them on the display device; an attacking capability value reducer which sequentially reduces the attacking capability value of the player character, in accordance with a time elapsed from the puzzle frame being displayed by the puzzle frame displayer, or from a first block being exposed by the block exposure; and an enemy survival capability value reducer that, in accordance with the squares of the puzzle frame filled with the blocks before the attacking capability value is reduced to the prescribed attacking limit value, reduces the survival capability value of the enemy character stored in the survival capability value storage.

The programs according to the heretofore described fifth and sixth aspects can be provided recorded on a computer readable recording medium. It is acceptable that the computer readable recording medium is a recording medium provided separate to the heretofore described computer device, configured in such a way that it can be attached to and removed from the computer device. It is also acceptable that the computer readable recording medium, being provided inside the computer device, is a recording medium such as a fixed disc device, provided along with the computer device. The programs according to the heretofore described fifth and sixth aspects can be delivered from a server device existing on a network, superimposing a data signal thereof on a signal carrier, to the computer device via the network.

BRIEF DESCRIPTION OF THE DRAWINGS

FIGS. 2A and 2B show a player character table and an enemy character table stored in an RAM of FIG. 1;

FIG. 6 is a flowchart showing in detail a puzzle battle process of FIG. 5; and FIG. 7 is a flowchart showing a modification example of the puzzle battle process of FIG. 5.

DESCRIPTION OF THE PREFERRED EMBODIMENT(S)

Hereafter, a description will be given of an embodiment of the invention, with reference to the appended drawings.

Figure 1:
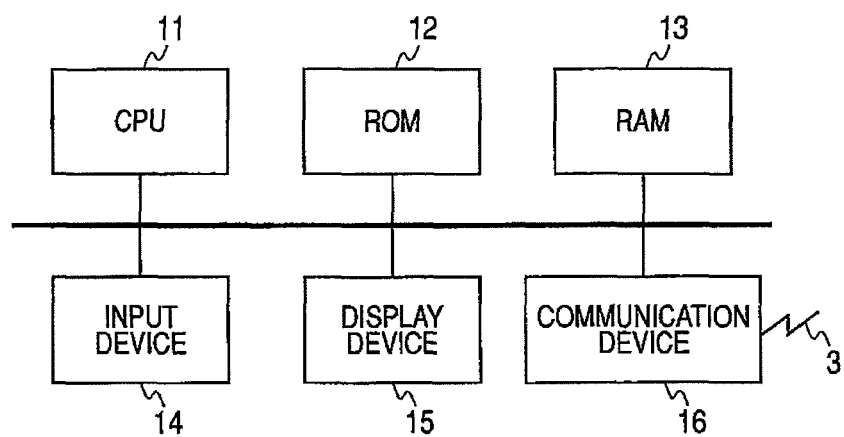
FIG. 1 is a block diagram showing a configuration of a portable telephone in which a video game according to an embodiment of the invention is executed.

FIG. 1 is a block diagram showing a configuration of a portable telephone which forms a platform for executing a game according to the embodiment. As shown in the figure, the portable telephone includes a CPU (Central Processing Unit) 11, an ROM (Read Only Memory) 12, an RAM (Random Access Memory) 13, an input device 14, a display device 15 and a communication device 16. In addition to these, the portable telephone also includes components necessary for carrying out a telephone call, but as they have no direct connection with the invention, they are omitted from FIG. 1.

The CPU 11, executing a program stored in the ROM 12, carries out processes necessary for an implementation of the game. The CPU 11, including an internal timer, generates a timer interruption every time the internal timer times a prescribed time (for example, one millisecond). The ROM 12 stores a process program of the CPU 11, which includes a game application program. At least one portion of the ROM 12 is configured of a flash memory which can electrically write and delete. The game application program (including fixed data used for the relevant application) is downloaded from a server device which exists on a network 3, and stored in the flash memory. The RAM 13, being backed up by a battery, as well as storing data such as various tables, to be described hereafter, is used as a work area of the CPU 11.

The input device 14, including numeral keys "0" to "1", a "*" key, a "#" key and direction keys, inputs necessary information into the CPU 11 by means of a player operation. When implementing the game, a player character is moved, and a command of an action or the like of the player character is selected, by means of the direction keys. The direction keys are also used to move a position of, and alter a direction of, a block in a puzzle battle, to be described hereafter. The display device 15, being configured of a liquid crystal display device or the like, displays a screen of the game being executed. The communication device 16 receives the program transmitted from the server device via the network 3, and stores it in the ROM 12.

In the embodiment, the game executed on the portable telephone of FIG. 1 is an RPG in which the player character is moved, in accordance with an input from the input device 14, on a field formed in a hypothetical space, and the player character is developed by fulfillment of a task given to the player during a game implementation process. As the task given to the player, there is a battle with an enemy character which is started when the player character reaches a prescribed position on the field. During the battle between the player character and the enemy character, it is possible, by means of a selection by the player, to carry out the puzzle battle to be described hereafter.

Next, a description will be given of data which change along with the implementation of the game, from among data relating to the player character which acts in accordance with an instruction from the player during the RPG according to the embodiment, and to the enemy character which carries out the battle with the player character. The data relating to the player character and the enemy character which change along with the implementation of the game are stored in the RAM 13.

FIG. 2A shows a player character table in which are registered the data relating to the player character. As shown in the figure, a player character name (PC name) 201, HP 202*a* and an HPmax 202*b*, MP 203*a* and an MPmax 203*b*, a level (Lv) 204, an experience value (Ev) 205, weapons 206, protective equipment 207, and possessed items 208 are registered in the player character table 200. The player character name 201 can either be one decided by the player selecting it at a game start time, or one fixed by a default and used without changing.

The HP 202*a* is a value which represents an ability of the player character to survive in the battle. The HP 202*a* being reduced, when undergoing an attack by the enemy character during the battle, in accordance with an effectiveness of the attack, in the event that the value reaches zero, the player character becomes unable to fight, and the game is over. The HPmax 202*b*, being a maximum value which can be acquired as the HP 202*a* value, is decided in accordance with the level 204 of the player character. The MP 203*a* is a value which represents an ability of the player character to try to unleash magic during the battle. The MP 203*a* being reduced in accordance with magic selected as the player character's attack method, unless the value is equal to or greater than a certain value, it becomes impossible to unleash the magic. The MPmax 203*b*, being a maximum value which can be acquired as the MP 203*a* value, is decided in accordance with the level 204 of the player character.

The level 204 being a current level of the player character, changes occur, in accordance with a difference in the value, in the HPmax 202*b*, the MPmax 203*b*, an attacking strength according to the weapons 206, and a defensive strength according to the protective equipment 207. The experience value 205 being a value which is an accumulation of points awarded every time the player character wins the battle with the enemy character, the level 204 increases every time the value reaches a prescribed value. The weapons 206, representing kinds of weapon with which the player character is currently equipped, fixes a regular attacking strength of the player character in accordance with the level 204.

The protective equipment 207, representing kinds of protective equipment with which the player character is currently equipped, fixes a defensive strength with respect to an attack by the enemy character in accordance with the level 204. One kind, or two kinds of attribute which are not mutually opposing attributes, from among attributes fire, earth, water and thunder, being set for each item of protective equipment with which the player character can be equipped, the player character can unleash magic of the attributes set for the protective equipment 207 with which it is equipped during the battle. Herein, fire and water, and earth and thunder, are opposing attributes, and it is possible to unleash a low-powered magic (fire, comet, blizzard, thunder), and a high-powered magic (firer, cometeo, blizzarer, thunderer) for each attribute.

Also, a defensive strength with respect to a magic attack by the enemy character changes in accordance with the attributes set for the protective equipment 207 with which the player character is equipped. Even though the enemy character unleashes magic of the same power, in the event that it is of the same attribute as that of the protective equipment 207 with which the player character is equipped, damage suffered (a reduction amount of the HP 202*a*) is small, while in the event that it is of a different attribute, the damage suffered is large. For example, in the event that the attribute of the protective equipment 207 with which the player character is equipped is fire, little damage is suffered when being attacked by the enemy character with magic of the attribute fire, but considerable damage is suffered in the event of being attacked with magic of the attribute water.

The possessed items 208 represent items which the player character currently possesses. As items which the player character can possess, there are those used for carrying out an attack against the enemy character during the battle, those for restoring the HP 202*a* or the MP 203*a*, those for seeing information on the enemy character, and the like. Also, the weapons and protective equipment with which the player character is not currently equipped, from among the weapons and protective equipment with which it can be equipped, are also possessed as the possessed items 208. The items can be acquired by picking them up from prescribed positions on the field, or by beating the enemy character in the battle.

FIG. 2B shows an enemy character table in which are registered data relating to the enemy character. As shown in the figure, an enemy character name (EC1 to EC*n*) 211, an appearance place 212, HP 213*a* and an HPmax 213*b*, MP 214*a* and an MPmax 214*b*, attributes 215, an attacking strength 216, a defensive strength 217, and an end flag (End) 218 are registered, for each enemy character appearing in the game, in the enemy character table 210. The enemy character names 211, being the names of the enemy characters, are also data used as a key for distinguishing between individual enemy characters.

The HP 213*a* is a value which represents an ability of the enemy character to survive in the battle. The HP 213*a* being reduced, when the enemy character undergoes an attack during the battle, in accordance with an effectiveness of the attack, in the event that the value is reduced to zero before the player character's HP 202*a* reach zero, the player character is deemed to have won the battle. The HPmax 213*b*, being both an initial value and a maximum value of the HP 213a, is fixed in advance for each enemy character. The MP 214a is a value which represents an ability of the enemy character to unleash magic during the battle. The MP 214a are reduced in the event that magic is unleashed as the enemy character's attack. The enemy character also becomes unable to unleash magic in accordance with the value of the MP 214a. The MPmax 214b, being both an initial value and a maximum value of the MP 214a, is fixed in advance for each enemy character.

One kind from among the attributes 215 fire, earth, water and thunder being set for each enemy character, the magic which the enemy character unleashes depends on the attribute 215. Also, the fact that damage suffered from magic of an opposing attribute is large, while damage suffered from magic of the same attribute is small, is the same as in the case of the player character. The attacking strength 216 represents an attacking strength of each enemy character's regular attack. The defensive strength 217 represents each enemy character's defensive strength with respect to an attack by the player character. The end flag 218 being a flag which is set in the event that the battle ends with a player character victory, when the player character arrives at an enemy character appearance place 212 in which the end flag 218 has not been set, the battle is started.

Next, a detailed description will be given of the battle between the player character and the enemy character, and of the puzzle battle carried out in accordance with a selection by the player during the relevant battle. When the player character arrives at a prescribed position on the field, in the event that a battle has not yet occurred in the relevant position, the battle with the enemy character is started.

Figure 3A:
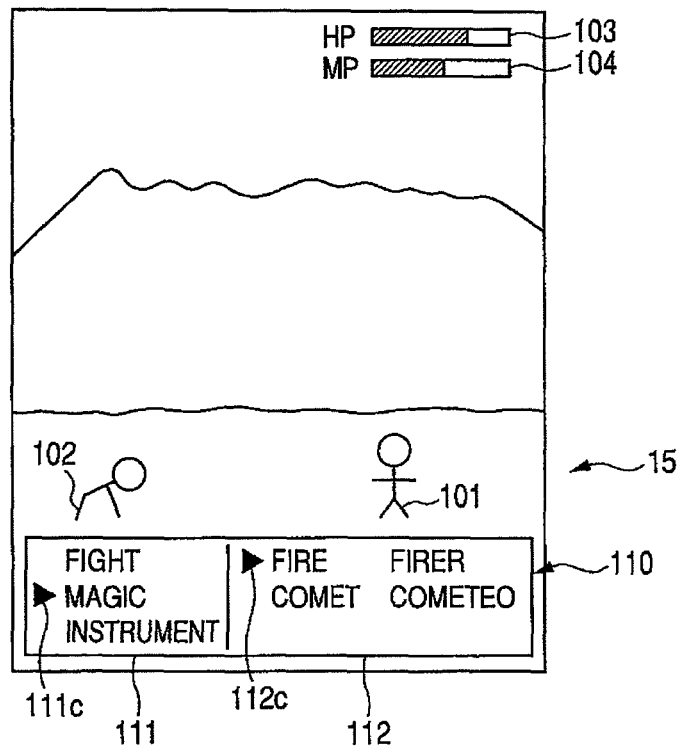
FIGS. 3A and 3B show a screen configuration in a case in which a battle is being carried out during a process implementing the video game according to the embodiment of the invention, and furthermore a screen configuration of a puzzle battle executed when "magic" is selected during the battle.

FIG. 3A shows a screen configuration of a battle displayed on the display device 15 in a situation in which the puzzle battle is not being carried out. As shown in the figure, the player character 101 and the enemy character 102 are displayed in the field on which the battle is carried out. Also displayed are an HP gauge 103 and an MP gauge 104, which respectively indicate the player character 101's HP 202a value and its ratio of the HPmax 202b, and the MP 203a value and its ratio of the MPmax 203b.

The player character 101 and the enemy character 102 each becoming able to act every time a prescribed time (differing between the player character 101 and the enemy character 102) elapses, when the enemy character 102 becomes able to act, an attack method of the enemy character 102 against the player character 101 is determined, the enemy character 102 carries out an attack against the player character 101 by the determined attack method, and reduces the player character 101's HP 202a in accordance with the effectiveness of the attack.

When the player character 101 becomes able to act, an action selection window 110 is displayed. The action selection window 110 being composed of an action command selection window 111 and an action category selection window 112, the player moves a cursor 111c inside the action command selection window 111 by operating the input device 14, and selects one action command from among "fight", "magic" and "instrument". "Fight" is an action command which instructs a carrying out of an attack against the enemy character 102 with the weapons 206 with which the player character 101 is currently equipped. In the event that "fight" is selected, the player character 101 carries out the attack against the enemy character 102 with the weapons 206 with which it is equipped, without the player carrying out a further, detailed selection, and reduces the enemy character 102's HP 213a in accordance with the effectiveness of the attack.

"Instrument" is a command which instructs a use of a desired item from among items (excluding the weapons and the protective equipment) owned by the player character 101. When "instrument" is selected from the action command selection window 111, an item to be used is selected, in accordance with a further instruction from the player, from inside the action category selection window 112. In the event that an item for attacking is selected, the player character 101 carries out an attack against the enemy character 102 with the selected item, and reduces the enemy character 102's HP 213a in accordance with the effectiveness of the attack.

Also, in the event that an HP restoring item is selected, the player character 101's HP 202a are increased by a prescribed amount, while in the event that an MP restoring item is selected, the player character 101's MP 203a are increased by a prescribed amount (as far, however, as the HPmax 202b and the MPmax 203b respectively). Alternatively, in the event that an item for acquiring the information on the enemy character 102 is selected, information on the enemy character 102's HP 213a, attributes 215, attacking strength 216, defensive strength 217, and the like is displayed on the display device 15.

"Magic" is an action command which instructs a carrying out of an attack against the enemy character 102, unleashing magic of attributes correlated to the protective equipment 207 with which the player character 1001 is currently equipped. When "magic" is selected from the action command selection window 111, the attributes correlated to the protective equipment 207 with which the player character 101 is equipped, and categories of magic which can be unleashed at a current MP 203a value, are displayed. The player moves a cursor 112c inside the action category selection window 112 by operating the input device 14, and instructs an unleashing of a desired category of magic.

Naturally, even in the event that "magic" is selected as the action command, and the magic category is selected, the magic is not unleashed against the enemy character 102 by this alone. In the RPG according to the embodiment, when "magic" is selected as the action command, and the magic category is selected, the puzzle battle is started, and the selected magic is unleashed only in the event that the puzzle is completed within a time limit during the puzzle battle. MP 203a of a certain value or greater remaining to the player character 101 being a condition for selecting "magic" as the action command, a condition for selecting the higher-powered (firer, cometeo, blizzarer, thunderer) is that a larger quantity of MP 203a are remaining. Then, the MP 203a are reduced in accordance with the category of the selected magic.

Figure 3B:
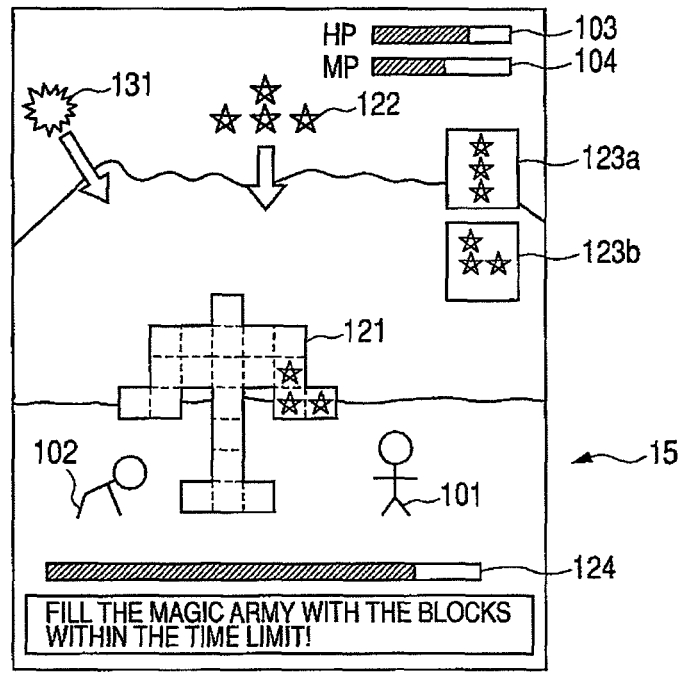

FIG. 3B shows a screen configuration of the puzzle battle displayed on the display device 15 when "magic" is selected during the battle. As shown in the figure, during the puzzle battle, a magic army 121, which is a puzzle frame composed of a plurality of squares, is displayed, as well as the player character 101 and the enemy character 102. A block 122 falling in turn from higher on the screen than the magic army 121, the player moves or rotates the falling block 122 by operating the input device 14, stops it in a desired position by means of an operation of the input device 14, and fills the magic army 121. When the block 122 has been stopped, the next block 122 comes down.

The falling blocks consisting of ones of various aspects besides the block 122 shown in FIG. 3B, a next block 123a which is to come down immediately after the currently falling block 122, and a one-after-next block 123b which is to come down immediately after that again, are displayed on the right side of the screen. A time limit being set for the completion (filling all the squares with the blocks) of the magic army 121, time remaining until an expiration of the time limit is indicated on a remaining time gauge 124.

Also, it being possible that a fireball 131 comes flying out as an attack by the enemy character 102 during the puzzle battle, even though one of the squares of the magic army 121 has been filled with a block, in the event that the fireball 131 collides with it, the relevant square portion disappears (that is, it becomes no longer filled with the block). Although the fireball 131 comes flying out at a prescribed time interval, it can happen that it flies to a place with no connection at all with the magic army 121, and it can also happen that, even though it flies into the range of the magic army 121, squares in its route are not filled in, in which cases the fireball 131 is a mishit, and the portion filled with the block does not disappear.

In the event that all the squares of the magic army 121 are filled with the sequentially falling blocks 122 between the start of the puzzle battle and the time limit elapsing (that is, until the remaining time indicated on the remaining time gauge 124 is zero), an attack by the player character 101 against the enemy character 102 unleashing the selected kind of magic is added, and the puzzle battle finishes. In the event that it is not possible to fill all the squares of the magic army 121 by the time the time limit elapses, the puzzle battle finishes without the magic being unleashed.

Figure 4A:
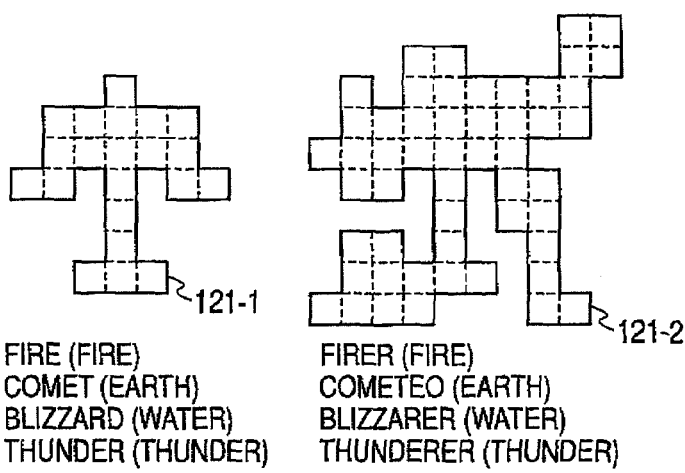
FIGS. 4A and 4B show examples of a magic army (a puzzle frame) and a falling block.

Next, a detailed description will be given of the magic army 121 and falling blocks 122 displayed on the display device 15 during the puzzle battle. FIG. 4A shows aspects of the magic army 121 applied in the puzzle battle. The magic army 121 applied in the puzzle battle includes a magic army 121-1, displayed when the low-powered (fire, comet, blizzard, thunder) are selected, and a magic army 121-2, displayed when the high-powered (firer, cometeo, blizzarer, thunderer) are selected.

The magic army 121-2 has a greater number of squares than the magic army 121-1, and its overall shape is also complex. As the number of extra squares makes it correspondingly more difficult to fill all the squares of the magic army 121-2 with the blocks than to fill those of the magic army 121-1, the time limit is accordingly longer, but the fact that the shape being complicated makes it more difficult to fill all the squares with the blocks than to fill those of the magic army 121-1 is not taken into consideration in the difference in the time limit. Also, a possibility of the magic army 121-2 undergoing the attack by the enemy character 102 with the fireball 131 is higher than for the magic army 121-1, but this is not taken into consideration in the difference in the time limit either. To summarize, even taking into consideration the fact that the time limit is longer, it is more difficult to fill all the squares of the magic army 121-2 with the blocks 122 than to fill those of the magic army 121-1.

Figure 4B:

Also, FIG. 4B shows examples of the blocks 122 which fall during the puzzle battle. Among the blocks 122 which fall during the puzzle battle, there exist seven kinds of block 122-1 to 122-7, having one to four squares which can fill the magic army 121. As it is possible, by means of the operation by the player of the input device 14, to rotate the blocks 122-1 to 122-7, patterns also exist for the blocks 122-2 and 122-3 rotated through 90 degrees, and for the blocks 122-4 to 122-6 rotated through 90 degrees, 180 degrees and 270 degrees. Which of the blocks 122-1 to 122-7 is caused to fall is decided at random.

As shown in FIGS. 4A and 4B, although the magic armies 121-1 and 121-2 are of relatively complex shapes, which of the blocks 122-1 to 122-7 is to come down is not decided in accordance with the shape of the magic armies 121-1 and 121-2, but is decided at random. For this reason, in the event that the player judges that the falling block 122 is not appropriate for filling the magic army 121, it is acceptable, without holding its position, to allow it to fall below the magic army 121, and disappear. In this case too, as long as it is within the time limit, the next block 122 comes down.

Also, depending on the shape of the sequentially falling block 122, a case can occur in which it is impossible from the outset to fill the magic army 121 without protrusion or overlapping. Even in a case in which a block 122 which could actually fill the magic army 121 without protrusion or overlapping is due to sequentially fall, as the player can see only as far as the one-after-next block 123*b*, it is difficult to predict which squares of the magic army 121 it is best to fill with the blocks 122 falling before.

As such, in the puzzle battle in this RPG, it is also possible to stop a block 122 which is falling in such a way as to protrude from the magic army 121, and to stop a block 122 which is falling overlapped with a previously stopped block. In any case, even though there is the protrusion or overlapping of the blocks, as long as all the squares of the magic army 121 can be filled with the sequentially falling blocks 122 within the time limit, it is possible to unleash the magic selected as a trigger for starting the puzzle battle.

Naturally, the protrusion and overlapping of the blocks has an effect on an effectiveness of the magic unleashed. In a case in which there is no protrusion or overlapping of the blocks, as the effectiveness of the attack with the magic by the player character 101 against the enemy character 102, the enemy character 102's HP 213*a* are reduced by a value calculated by $\alpha \times M \times Ae \times R/De$. Herein, $\alpha$ is a prescribed constant number, M is a quantity of squares of the magic army 121, Ae is an attribute coefficient (large in the event that the magic is of the opposite attribute to the enemy character's attribute 215, and small in the event that the magic is of the same attribute), R is a random value which takes a value of a prescribed range, and De is the enemy character 102's defensive strength 217.

As opposed to this, in a case in which there is the overlapping of the blocks, an amount by which it is possible to reduce the enemy character 102's HP 213*a* by the attack with the magic by the player character 101 against the enemy character 102 becomes $\alpha \times (M-1.5O) \times Ae \times R/De$. Herein, O being a quantity of overlapping squares of different blocks 122, squares where three blocks are overlapping are counted as two squares worth of overlap. Even in the event that M−1.5O becomes less than zero, it does not happen that the enemy character 102's HP 213*a* are increased.

Also, in a case in which there is the protrusion of the block, the player character 101 also suffers a loss due to the magic it has unleashed itself, and the HP 202*a* are reduced by a value calculated by $\beta \times P \times Ap \times R/Dp$. Herein, $\beta$ is a prescribed constant number, P is a quantity of squares of the blocks 122 protruding from the magic army 121, Ap is an attribute coefficient (large in the event that the magic is of the opposite attribute to the attribute of the protective equipment 207 with which the player character 101 is equipped, and small in the event that it is of the same attribute), and Dp is the defensive strength fixed by the protective equipment 207 with which the player character 101 is equipped and the level 204. R is the same random value as when calculating the effectiveness against the enemy character 102.

In order to time a time for making each of the player character 101 and the enemy character 102 capable of action in the battle, a player character attack time timer and an enemy character attack time timer, a value of each of which is updated by a timer interruption generated by the CPU 11, are provided in the RAM 13. Every time a value of these timers reaches a prescribed value, the player character 101 or the enemy character 102 becomes capable of action. When the player character 101 or the enemy character 102 commits an action, the value of the player character attack time timer or the enemy character attack time timer is initialized at zero. Also, in order to time a time elapsed in the puzzle battle, a magic army compilation time timer, a value of which is updated by a timer interruption generated by the CPU 11, is provided in the RAM 13. When the value of the magic army compilation time timer reaches a prescribed value dependent on the kind of magic, the time limit is taken to have elapsed.

In the battle including the above kind of puzzle battle, in the event that the enemy character 102's HP 213a are reduced to zero before the player character 101's HP 202a reach zero, the player character 101 is deemed to have won. In the event that the player character 101 wins the battle, the experience value 205 is increased, and furthermore, every time the experience value 205 reaches a prescribed value, the level 204 is raised. Also, an item is presented to the player character 101 depending on the kind of enemy character 102. Then, the game is restarted, moving the player character 101 on the field again from the position in which the battle had started.

Contrarily, in the event that the player character 101's HP 202a reach zero before the enemy character 102's HP 213a are reduced to zero, the player character 101 is deemed to have lost. In this case, the game finishes immediately.

Hereafter, a description will be given of the processes which the portable telephone of FIG. 1 executes in order to implement the RPG according to the embodiment. In the RPG according to the embodiment too, in the same way as in other RPG's, the game progressing while the player character is being moved on the field, when the player character 101 reaches the prescribed position on the field, the battle between the player character 101 and the enemy character 102 starts. Naturally, as processes before the battle starts have no direct connection with the invention, a detailed description will be omitted.

Figure 5:
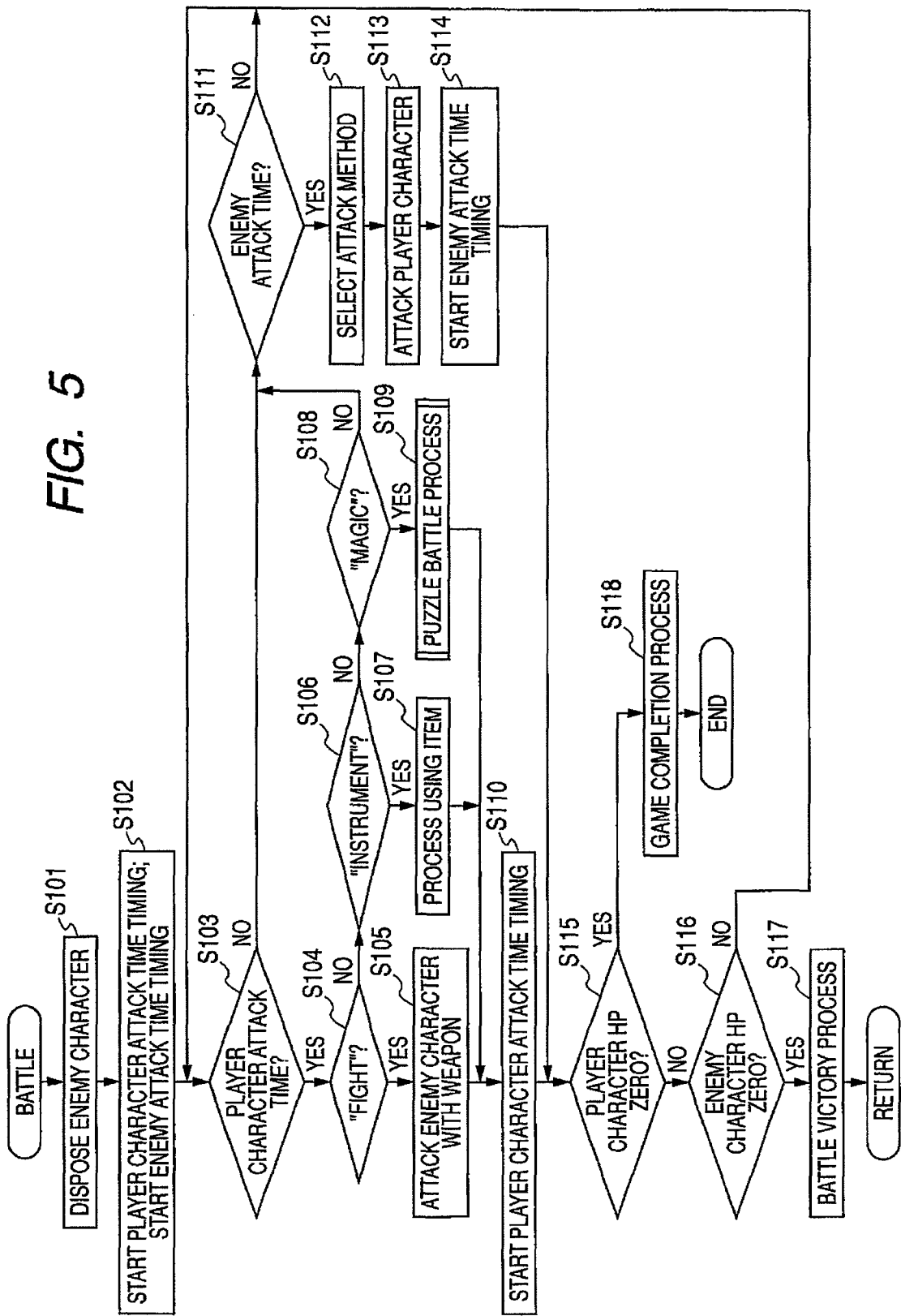
FIG. 5 is a flowchart showing a battle process executed during the process implementing the video game according to the embodiment of the invention.

FIG. 5 is a flowchart showing a battle process. When the battle between the player character and the enemy character starts, the CPU 11 disposes the enemy character 102, which has made the relevant position the appearance place 212, on the field along with the player character 101 (step S101). Next, the CPU 11, initializing the player character attack time timer and the enemy character attack time timer of the RAM 13, starts anew the timing of the player character attack time and the enemy character attack time (step S102).

The CPU 11 determines whether or not the player character 101 has become capable of action depending on whether or not the player character attack time timer has reached the prescribed value (step S103). If the player character 101 has become capable of action, the CPU 11 determines whether or not "fight" has been selected as the action command instructing the action of the player character 101 by the operation of the input device 14 (step S104). If "fight" has been selected, the CPU 11 inflicts the attack on the enemy character 102 using the weapons 206 with which the player character 101 is equipped, and reduces the enemy character 102's HP 213a in accordance with the effectiveness of the attack (step S105). Then, the CPU 11 proceeds to a process of step S110.

If "fight" has not been selected as the action command, the CPU 11 determines whether or not "instrument" has been selected as the action command instructing the action of the player character 101 by the operation of the input device 14 (step S106). If "instrument" has been selected, the CPU 11 further carries out a process using the kind of item selected by the operation of the input device 14 from among the items displayed in the action category selection window 112 (step S107).

For example, if the item for attacking has been selected, the CPU 11 inflicts the attack by the player character 101 on the enemy character 102, and reduces the enemy character 102's HP 213a in accordance with the effectiveness thereof. If the HP restoration item or the MP restoration item has been selected, the CPU 11 increases the player character 101's HP 202a or MP 203a. If the item for acquiring the information on the enemy character 102 has been selected, the CPU 11 displays various information on the enemy character 102 on the display device 15. Then, the CPU 11 proceeds to the process of step S110.

If "instrument" has not been selected as the action command either, the CPU 11 determines whether or not "magic" has been selected as the action command instructing the action of the player character 101 by the operation of the input device 14 (step S108). If "magic" has been selected, the CPU 11 carries out a puzzle battle process, to be described in detail hereafter (step S109). On returning from the puzzle battle process, the CPU 11 proceeds to the process of step S110.

If "magic" has not been selected as the action command either, the CPU 11 proceeds to a process of step S111. If the player character 101 has not become capable of action in step S103, the CPU 11 proceeds to the process of step S111. In step S110, the CPU 11 initializes the player character attack time timer of the RAM 13, and starts anew the timing of the player character attack time. Then, the CPU 11 proceeds to a process of step S115.

In step S111, the CPU 11 determines whether or not the enemy character 102 has become capable of action depending on whether or not the enemy character attack time timer has reached the prescribed value. If the enemy character 102 has not become capable of action either, the CPU 11, returning to the process of step S103, further continues determining whether or not the player character 101 has become capable of action.

If the enemy character 102 has become capable of action, the CPU 11 selects an attack method of the enemy character 102 against the player character 101. Herein, in order to select the magic as the attack method, it is necessary that the enemy character 102's MP 214a are equal to or greater than the prescribed value (step S112). The CPU 11, with the attack method selected at this point, inflicts the attack by the enemy character 102 on the player character 101, and reduces the player character 101's HP 202a in accordance with the effectiveness of the attack (step S113). The CPU 11 initializes the enemy character attack time timer of the RAM 13, and starts anew the timing of the enemy character attack time (step S114). Then, the CPU 11 proceeds to the process of step S115.

In step S115, the CPU 11 determines whether or not the player character 101's HP 202a have reached zero. If the player character 101's HP 202a have not reached zero, as it is still possible for the player character 101 to continue fighting, the CPU 11 then determines whether or not the enemy character 102's HP 213a have reached zero (step S116). If the enemy character 102's HP 213a have not reached zero either, as it is still possible for the enemy character 102 to continue fighting too, the CPU 11, returning to the process of step S103, continues the battle between the player character 101 and the enemy character 102.

If the enemy character 102's HP 213a have reached zero, the CPU 11, carrying out a battle victory process, increases the player character 101's experience value 205, raises the HPmax 202b and the MPmax 203b as well as raising the level 204 as necessary, and furthermore gives the item to the player character 101 depending on the enemy character 102 which the player character 101 has defeated (step S117). Then, finishing the battle process, the CPU 11 continues the game while again moving the player character 101 on the field. Contrarily, if the player character 101's HP 202a have reached zero, the CPU 11 carries out a prescribed game completion process (step S118). Then, the CPU 11 finishes the processes of the RPG according to the embodiment.

FIG. 6 is a flowchart showing in detail the puzzle battle process of step S109. In the puzzle battle process, the CPU 11 further displays the magic army 121 depending on the kind of magic selected by the operation of the input device 14 from among the magic displayed in the action category selection window 112 (the magic army 121-1 in the case of fire, comet, blizzard or thunder, and the magic army 121-2 in the case of firer, cometeo, blizzarer or thunderer) on the display device 15 (step S201). The CPU 11 reduces the player character 101's MP 203a by the value corresponding to the magic selected (step S202).

Next, the CPU 11 initializes the magic army compilation time timer of the RAM 13, and starts anew the timing of the magic army compilation time (step S203). Also, the CPU 11 initializes the enemy character attack time timer of the RAM 13, and starts anew the timing of the enemy character attack time. It is acceptable that the enemy character attack time timer used in the puzzle battle process is different from the enemy character attack time timer in the event of not shifting to the puzzle battle process (step S204).

The CPU 11 determines whether or not the time limit for compiling the magic army 121 has elapsed, depending on whether or not the value of the magic army compilation time timer has reached the prescribed value corresponding to the kind of magic (fire, comet, blizzard or thunder, or firer, cometeo, blizzarer or thunderer) (step S205).

If the magic army compilation time limit has not elapsed, the CPU 11 determines whether or not the block 122 currently falling is being displayed on the display device 15 (step S206). If the block 122 currently falling is being displayed, the CPU 11 proceeds directly to the process of step S208. If the block 122 currently falling is not being displayed, the CPU 11 newly displays the kind of block which has been displayed as the next block 123a above the magic army 121 as the block 122. The CPU 11 also makes the kind of block which has been displayed as the one-after-next block 123b the next block 123a, decides a kind of a new one-after-next block 123b, and displays it on the display device 15 (step S207). Then, the CPU 11 proceeds to the process of step S208.

In step S208, the CPU 11 causes the block 122 displayed on the display device 15 to fall to a lower portion of the display device 15. Herein, if the block 122 is caused to fall below the magic army 121, the CPU 11 causes the block 122 displayed thus far to cease to be displayed (step S208).

Next, the CPU 11 determines whether or not an instruction fixing the position of the falling block 122 as the position currently being displayed has been input by an operation of the input device 14 (step S209). If the instruction fixing the position of the falling block 122 as the position currently being displayed has been input, the CPU 11 stops the block 122 in that position, and fills the squares of the magic army 121 (step S210). The CPU 11 determines whether or not, as a result of the squares of the magic army 121 being filled at this point, all of the squares in the magic army 121 have been filled with the blocks 122 which have sequentially come down, and the magic army 121 completed (step S211). If the magic army 121 has not been completed, the CPU 11 proceeds to a process of step S214.

If the instruction fixing the position of the falling block 122 as the position currently being displayed has not been input, the CPU 11 determines whether or not an instruction to move the position of the falling block 122, or an instruction to rotate the falling block 122, has been input by an operation of the input device 14 (step S212). If neither the instruction to move nor the instruction to rotate the falling block 122 has been input, the CPU 11 proceeds directly to the process of step S214. If the instruction to move or the instruction to rotate the falling block 122 has been input, the CPU 11, in accordance with the instruction input, moves the position of the block 122 or rotates the block 122 (step S213). Then, the CPU 11 proceeds to the process of step S214.

In step S214, the CPU 11 determines whether or not a time has come for the enemy character 102 to attack the magic army 121, depending on whether or not the enemy character attack time timer has reached a prescribed value (it is acceptable that it is a higher value than the prescribed value in step S111). If the time for the enemy character 102 to attack the magic army 121 has not come, the CPU 11 returns directly to the process of step 205.

If the time for the enemy character 102 to attack the magic army 121 has come, the CPU 11 causes the fireball 131 to appear on the display device 15, and moves it in a direction of the magic army 121, or in a direction unconnected with the magic army 121 (step S215). The CPU 11 determines whether or not the fireball 131 has collided with a square, among the squares of the magic army 121, filled with a block of which the position has already been fixed (step S216).

If the fireball 131 has collided with the square of the magic army 121 filled with the block, the CPU 11 causes the square portion with which the fireball 131 has collided, among the squares of the magic army 121 filled with the block, to disappear, returning it again to a condition in which it is not filled with the block (step S217). Then, the CPU 11 proceeds to a process of step S218. If the fireball 131 has not collided with the square of the magic army 121 filled with the block, the CPU 11 proceeds directly to the process of step S218. In step S218, the CPU 11 initializes the enemy character attack time timer of the RAM 13, and starts anew the timing of the enemy character attack time. Then, the CPU 11 returns to the process of step S205.

Also, if all the squares in the magic army 121 are filled, and the magic army 121 completed, in step S211, the CPU 11 unleashes the magic selected as the trigger for shifting to the puzzle battle process. By unleashing this magic, the enemy character 102's HP 213a are reduced by the value calculated by $\alpha \times (M-1.5O) \times Ae \times R/De$ ($\alpha$ is the prescribed constant number, M is the quantity of squares of the magic army 121, Ae is the attribute coefficient, R is the random value which takes the value of the prescribed range, De is the enemy character 102's defensive strength 217, and O is the quantity of overlapping squares of the different blocks 122).

Also, in the case in which there is the square of the block which protrudes from the magic army 121, the player character 101's HP 202a are reduced by the value calculated by $\beta \times P \times Ap \times R/Dp$ ($\beta$ is the prescribed constant number, P is the quantity of squares of the blocks 122 protruding from the magic army 121, Ap is the attribute coefficient, and Dp is the defensive strength fixed by the protective equipment 207 with which the player character 101 is equipped and the level 204) (step S219). Then, the CPU 11 finishes the puzzle battle process, and returns to the flowchart of FIG. 5.

Also, in the event that the magic army compilation time timer has timed the prescribed time, and reached the time limit for compiling the magic army 121, in step S205, the CPU 11 deletes the magic army 121 being displayed on the display device 15, without unleashing the selected kind of magic (step S220). Then, the CPU 11 finishes the puzzle battle process, and returns to the flowchart of FIG. 5.

As heretofore described, in the RPG according to the embodiment, when the player character 101 reaches the prescribed position on the field, the battle with the enemy character 102 is started and, in the event that the player selects "magic" as the action of the player character 101 in the battle, the puzzle battle process is started. In the puzzle battle process, the magic army 121 is displayed on the display device 15, and the squares of the magic army 121 are filled by moving or rotating the blocks 122 falling from above in accordance with the operation of the player. Herein, whether or not it is possible to efficiently fill each square of the magic army 121 is dependent on a degree of skill in the operation of moving and rotating the falling blocks 122.

Herein, although the time limit is set for filling the squares of the magic army 121 with the blocks 122, in the event that the player cannot fill all of the squares of the magic army 121 within the time limit, it does not happen that the selected kind of magic is unleashed. Even though the player selects "magic" as the action of the player character 101, in the event that, the magic army 121 not being completed, the selected kind of magic is not unleashed, it does not happen that the enemy character 102's HP 213a are reduced. In the event that the magic army 121 is completed, it is possible to unleash the selected kind of magic, and reduce the enemy character 102's HP 213a.

In order for the player character 101 to win the battle between the player character 101 and the enemy character 102, it is necessary to reduce the enemy character 102's HP 213a as far as possible, but whether or not the enemy character 102's HP 213a can be reduced depends on a difference in the degree of skill in a puzzle game in which all the squares of the magic army 121 are filled in this way. For this reason, as the player's degree of skill plays a large part in the battle between the player character 101 and the enemy character 102, a strategic element of the battle is high, and a game variety increases.

Also, although RPG's, including the one according to the embodiment, are generally games with a story element, in battles in heretofore known RPG's, as the player character 101 has carried out actions as selected by the player, the player's degree of skill has not been largely reflected. To date, the only game, from among games in which the player's degree of skill is clearly reflected, which can be employed in the battle including an element of competition against the enemy character 102, has been a racing game. In the RPG according to the embodiment, as it incorporates in the battle the element of the puzzle game, in which the player's degree of skill is clearly reflected, the game variety is extremely high.

Also, although it is necessary to fill all of the squares of the magic army 121 with the blocks 122 in order to unleash the kind of magic which the player has selected, in the puzzle battle process according to the embodiment, the protrusion of the block from the magic army 121, and also the overlapping of the blocks filling the magic army 121, are permitted. Even though there is the protrusion or overlapping of the blocks, just as long as it is possible to fill all the squares of the magic army 121 within the time limit, it is possible to unleash the kind of magic which the player has selected. For this reason, even a player whose degree of skill at the puzzle game is not particularly high can sufficiently enjoy the battle between the player character 101 and the enemy character 102 including the puzzle battle process.

Naturally, in the event that the protrusion of the block from the magic army 121 occurs, the damage is also inflicted on the player character 101 in accordance with the quantity of the protruding squares, and the HP 202a are reduced. Also, in the event that the overlapping of the blocks filling the magic army 121 occurs, the damage inflicted on the enemy character 102 is reduced in accordance with the quantity of squares where the blocks have overlapped, and the amount by which the HP 213a are reduced decreases. For this reason, even though the protrusion and overlapping of the blocks are permitted in order that the player whose degree of skill is not particularly high can also have fun, it is still possible to reflect the difference in players' degree of skill in a result of the puzzle battle process.

Also, whether or not the magic is unleashed as the attack by the player character 101 against the enemy character 102 during the battle being left entirely to a choice of the player, it is also possible to carry out the battle in such a way that the player character 101 beats the enemy character 102 without ever selecting "magic" as the action of the player character 101. For this reason, it being unlikely, even in a case of a player who is extremely poor at puzzle games such as the puzzle battle process, to happen that the player character 101 will be completely unable to beat the enemy character 102, it is possible to enjoy the RPG according to the embodiment as a game.

Also, in the case in which the player has selected "magic" as the action of the player character 101, as long as the value of the MP 203a is sufficient, it is possible to select any of the low-powered magic (fire, comet, blizzard, thunder) or the high-powered magic (firer, cometeo, blizzarer, thunderer), from among the magic of the attribute set for the protective equipment 207 with which the player character 101 is currently equipped. Herein, in the event that the player selects the low-powered magic, the magic army 121-1 with both the small quantity of squares and the comparatively simple shape is displayed on the display device 15, but in the event that the player selects the high-powered magic, the magic army 121-2 with both the large quantity of squares and the comparatively complex shape is displayed on the display device 15, and the puzzle battle process is carried out.

As it is possible to carry out both the comparatively simple puzzle game and the comparatively complex puzzle game by means of the player's selection in this way, it is possible to enjoy the puzzle game process in accordance with the player's degree of skill. Naturally, in the case in which the player selects the high-powered magic, which involves going through the complex puzzle game, in the event that it is possible to fill all the squares of the magic army 121-2 within the time limit, a greater damage is inflicted on the enemy character 102 than in the case of selecting the low-powered magic. For this reason, as well as a game aspect of the puzzle battle process becoming diverse, it is possible to reflect the difference in the players' degree of skill in the result of the puzzle battle process.

Furthermore, while the puzzle battle process is being carried out too, the enemy character 102's attack time arrives at a certain time interval, and it attacks the magic army 121 with the fireball 131. In the event that the fireball 131 collides with the square, among the squares of the magic army 121, which is already filled with the block, the relevant square disappears. As it can happen that the square of the magic army 121 once filled by the operation of the player is caused to disappear in this way, the strategic element of the game further increases. Naturally, this kind of disappearance of the square, among the squares of the magic army 121, once filled with the block is also brought about as the result of the attack by the enemy character 102 with the fireball 131. For this reason, in the puzzle battle process too, it is possible not to eliminate the element of the battle between the player character 101 and the enemy character 102.

The invention not being limited to the heretofore described embodiment, a variety of modifications and applications are possible. Hereafter, a description will be given of modification aspects of the heretofore described embodiment applicable to the invention.

In the heretofore described embodiment, in the event that it is possible to fill all the squares of the magic army 121 with the blocks within the time limit for compiling the magic army 121, as long as the quantity of protruding or overlapping squares and the kind of magic selected are the same, no difference is provided in the calculation method of the effectiveness of the magic unleashed. Naturally, even though it is possible to complete the magic army 121 within the same time limit, it should be difficult to complete the magic army 121 in a shorter time. Therefore, it is acceptable to increase the effectiveness of the magic (that is, to increase the reduction amount of the enemy character 102's HP 213*a*) in accordance with the time remaining until the time limit when the magic army 121 is completed.

In the heretofore described embodiment, when selecting the high-powered magic (firer, cometeo, blizzarer or thunderer), the magic army 121-2, with a greater quantity of squares and a more complex shape than the magic army 121-1 displayed when selecting the low-powered magic (fire, comet, blizzard or thunder), is displayed on the display device 15. Herein, the magic army 121-2 is of an aspect which can completely include the magic army 121-1.

Therefore, it is possible to arrange in such a way that, when the player has selected the high-powered magic and the magic army 121-2 has been displayed, even though it is not possible to complete the magic army 121-2 within the time limit, in the event that it is possible to complete as far as the magic army 121-1 portion within the time limit, an effectiveness commensurate with the low-powered magic is generated. In this case, it is acceptable that the time limit for completing as far as the magic army 121-1 portion in order to generate the effectiveness of the low-powered magic is set shorter than the time limit for completing a whole of the magic army 121-2.

In the heretofore described embodiment, the timing of the magic army compilation time is started when the puzzle battle is started and, in the event that the magic army 121 is completed before the time elapsing from that point reaches the prescribed time limit, the magic selected for the relevant puzzle battle is unleashed. Contrarily, in the event that the prescribed time limit is reached while the magic army 121 is still unfinished, the puzzle battle is finished without unleashing the magic. Naturally, the selection of "magic", which is a precondition for the puzzle battle, is only possible when there are sufficient player character MP 203*a*, and the MP 203*a* are reduced by selecting "magic".

That is, in the case in which "magic", which is the precondition for the puzzle battle, is selected, the consumption amount of the MP 203*a* is the same in the event that the kind of "magic" selected is the same, and in the event that the protrusion and overlapping of the blocks are the same, the difference in the result of the puzzle battle occurs only due to the difference of whether or not the magic army 121 has been completed within the time limit. As opposed to this, it is also possible to arrange that, without particularly providing the concept of the time limit from the start of the puzzle battle, by employing a method by which the MP 203*a* are reduced in accordance with the elapsing of time during the puzzle battle, the difference in the result of the puzzle battle is generated depending on whether the completion time of the magic army 121 is fast or slow.

FIG. 7 is a flowchart showing a modification example of the puzzle battle process for realizing this kind of puzzle battle. In a case in which the puzzle battle is carried out in accordance with this flowchart, the remaining time gauge 124 is not displayed on the puzzle battle screen of FIG. 3B. Naturally, as the reduction of the MP 203*a* becomes an extremely important factor in the puzzle battle carried out in accordance with this flowchart, it is acceptable, rather than displaying the MP gauge 104 at the same size as the HP gauge 103 as in FIG. 3B, to display it large in the position of the remaining time gauge 124.

In the puzzle battle process of FIG. 7, the CPU 11 displays the magic army 121 depending on the kind of magic selected by the operation of the input device 14 from among the magic displayed in the action category selection window 112 on the display device 15 (step S301). Next, the CPU 11 initializes an MP reduction time timer of the RAM 13, and starts anew timing of MP reduction time (step S302). Also, the CPU 11 initializes the enemy character attack time timer of the RAM 13, and starts anew the timing of the enemy character attack time (step S303).

The CPU 11 determines whether or not a time to reduce the player character 101's MP 203*a* has come, depending on whether or not a value of the MP reduction time timer has reached a prescribed value (step S304). If the time to reduce the player character 101's MP 203*a* has not come, the CPU 11 proceeds directly to a process of step S308.

If the time to reduce the player character 101's MP 203*a* has come, the CPU 11 reduces the player character 101's MP 203*a* by a prescribed amount (step S305). The CPU 11 determines whether or not the player character 101's MP 203*a* have reached zero as a result of reducing the player character 101's MP 203*a* by the prescribed amount at this point (step S306). If the player character 101's MP 203*a* have not reached zero, the CPU 11 initializes the MP reduction time timer of the RAM 13, and starts anew the timing of the MP reduction time (step S307). Then, the CPU 11 proceeds to the process of step S308.

Processes of steps S308 to S321 are the same as the processes of steps S206 to S219 shown in the flowchart of FIG. 6. If the player character 101's MP 203*a* have reached zero in step S306, the CPU 11 deletes the magic army 121 being displayed on the display device 15, without unleashing the kind of magic selected (step S322). Then, the CPU 11 finishes the puzzle battle process, and returns to the flowchart of FIG. 5.

As heretofore described, in the puzzle battle process of the modification example, the player character 101's MP 203*a* are reduced in accordance with the elapsing of time until it is possible to fill all the squares of the magic army 121 with the blocks. The shorter the time until it is possible to fill all the squares of the magic army 121, the smaller the reduction volume of the MP 203*a*. Even though it is possible to unleash the magic and reduce the enemy character 102's HP 213*a* in the same way, being able to minimize the reduction of the MP 203*a* is more advantageous to the player, but the player's degree of skill has a considerable influence in the minimizing of the reduction of the MP 203*a*, that is, in the filling of all the squares of the magic army 121 in a short time. For this reason, the strategic element of the puzzle battle process is further increased.

In the case in which, as in FIG. 7, the puzzle battle is implemented while reducing the MP 203*a* at the prescribed interval, and the magic is unleashed in the event that the magic army 121 is completed before the MP 203*a* reach zero, in the event that the player character owns as the instrument the item for restoring the MP, it is also possible, in accordance with the player's instruction from the input device 14, to use the item for restoring the MP during the implementation of the puzzle battle, and restore the value of the player character 101's MP 203*a* before the MP 203*a* reach zero.

By this means, as long as the player character 101 possesses the item for restoring the MP, and is using it, as it is possible to fill the squares of the magic army 121 with the blocks regardless of the time elapsed from the start of the puzzle battle process, a chance of the player filling the squares of the magic army 121 increases. By this means, it is possible to further increase the variety of the game in the puzzle battle process. Also, by the chance of filling the squares of the magic army 121 increasing, as it is possible for even the player who does not have a high degree of skill to unleash the magic without being preoccupied with the time, it is possible to enjoy the puzzle battle process.

Although it is also possible to restore the player character's MP during the puzzle battle process shown in FIG. 6 by using the item for restoring the MP, as it is possible, even without this, to use the item for restoring the MP during battles other than the puzzle battle, there occurs no particular advantage.

In the heretofore described embodiment, in the event that it is not possible to fill all the squares of the magic army 121 with the blocks within the time limit for compiling the magic army 121 (alternatively, in the modification example of FIG. 7, before the player character 101's MP 203*a* reach zero), the magic which the player has selected is not unleashed. Naturally, even though it is not possible to fill all the squares of the magic army 121, it is acceptable to unleash magic of an effectiveness depending on a quantity of squares filled at a point at which the time limit elapses (in the modification example of FIG. 7, at a point at which the MP 203*a* reach zero).

For example, in a case in which a quantity of squares which have not been filled is taken as N, the enemy character 102's HP 213*a* are reduced by a value calculated by $\alpha \times (M-1.5O-2N) \times Ae \times R/De$ ($\alpha$ is the prescribed constant number, M is the quantity of squares of the magic army 121, Ae is the attribute coefficient, R is the random value which takes the value of the prescribed range, De is the enemy character 102's defensive strength 217, and O is the quantity of squares where the different blocks 122 have overlapped).

Alternatively, it is also acceptable to reduce the player character 101's HP 202*a* by a value calculated by $\beta \times (P+2N) \times Ap \times R/Dp$ ($\beta$ is the prescribed constant number, P is the quantity of squares of the blocks 122 protruding from the magic army 121, Ap is the attribute coefficient, and Dp is the defensive strength fixed by the protective equipment 207 with which the player character 101 is equipped and the level 204). It is also acceptable to reduce both the enemy character 102's HP 213*a* and the player character 101's HP 202*a*.

In this case, even though it is not possible to fill all the squares of the magic army 121 within the time limit (in the modification example of FIG. 7, before the MP 203*a* reach zero), as it is possible to inflict damage on the enemy character 102 in accordance with the quantity of squares which it has been possible to fill, the player who does not have a very high degree of skill can also enjoy the puzzle battle process. Naturally, the larger the quantity of the squares, among all the squares of the magic army 121, which can be filled within the time limit (in the modification example of FIG. 7, before the MP 203*a* reach zero), the more it is possible to increase the damage which is inflicted on the enemy character 102, and to reduce the damage suffered by the player character 101, meaning that it is still possible to reflect the difference in the players' degree of skill in the result of the puzzle battle process.

In the heretofore described embodiment, although the protrusion of the block from the magic army 121 is permitted without limit when filling the squares of the magic army 121 with the blocks 122, the damage is suffered by the player character 101 in accordance with the quantity of protruding squares. In relation to this, it is also acceptable to reduce the damage inflicted on the enemy character 102 in accordance with the quantity of block squares protruding from the magic army 121. It is also acceptable to use the inflicting of the damage on the player character 101 and the reduction of the damage inflicted on the enemy character 102 in tandem. By reducing the damage inflicted on the enemy character 102 in accordance with the quantity of squares protruding from the magic army 121 in this way too, it is possible to reflect the difference in the players' degree of skill in the difference in the result of the puzzle battle process.

Contrarily, it is also acceptable, making the protrusion of the block from the magic army 121 irrelevant, not to inflict the damage on the player character 101, or reduce the damage inflicted on the enemy character 102, depending on the protrusion, as long as all the squares of the magic army 121 are filled. Furthermore, it is also acceptable to impose a certain limit on the quantity of squares which can protrude from the magic army 121.

In the heretofore described embodiment, although the overlapping of the blocks filling the magic army 121 is permitted without limit when filling the squares of the magic army 121 with the blocks 122, the damage inflicted on the enemy character 102 is reduced in accordance with the quantity of squares where the blocks have overlapped. In relation to this, it is also acceptable to inflict the damage on the player character 101 in accordance with the quantity of squares where the blocks have overlapped. It is also acceptable to use the reduction of the damage inflicted on the enemy character 102 and the inflicting of the damage on the player character 101 in tandem. By inflicting the damage on the player character 101 in accordance with the quantity of squares where the blocks filling the magic army 121 have overlapped in this way too, it is possible to reflect the difference in the players' degree of skill in the difference in the result of the puzzle battle process.

Contrarily, it is also acceptable, making the overlapping of the blocks filling the magic army 121 irrelevant, not to reduce the damage inflicted on the enemy character 102, or inflict the damage on the player character 101, depending on the overlapping of the blocks, as long as all the squares of the magic army 121 are filled. Furthermore, it is also possible to impose a certain limit on the quantity of squares by which the blocks filling the magic army 121 can overlap.

In the heretofore described embodiment, the protrusion of the block from the magic army 121 is permitted, though the damage is inflicted on the player character 101 too, and the overlapping of the blocks filling the magic army 121 is permitted, though the damage inflicted on the enemy character 102 is reduced. Naturally, it is acceptable not to use all the blocks 122 sequentially falling from above the magic army 121 displayed on the display device 15 for filling the squares of the magic army 121. Therefore, it is also acceptable not to permit at all the protrusion of the block from the magic army 121 or the overlapping of the blocks filling the magic army 121.

In the heretofore described embodiment, the enemy character 102 launching the attack with the fireball 131 at the certain interval during the puzzle battle process, in the event that the fireball 131 collides with the square, among the squares of the magic army 121, already filled with the block, the square returns again to the condition in which it is not filled with the block. However, in the case in which the fireball 131 collides with the square already filled with the block, it is also acceptable to make a whole of the block which had filled the square disappear. Also, it also being acceptable that, as the attack of the enemy character 102, a destruction of the whole of the magic army 121 occurs at a prescribed rate, in this case, it is possible to return to a condition in which none of the squares of the magic army 121 is filled with the block.

In the heretofore described embodiment, the square, among the squares of the magic army 121, already filled with the block is destroyed by the attack by the enemy character 102 with the fireball 131. Meanwhile, both the protrusion of the block from the magic army 121 and the overlapping of the blocks filling the magic army 121 are permitted. Therefore, it is also acceptable that, in a case in which the fireball 131 which has come flying out during the attack by the enemy character 102 collides with the block square which is protruding from the magic army 121, the protrusion is made to disappear. Also, it is acceptable that, in a case in which the fireball 131 which has come flying out during the attack by the enemy character 102 collides with the square where the blocks filling the magic army 121 are overlapping, the overlap is made to disappear (that is, the relevant square becomes filled with only one block).

In this case, it becoming possible to employ a strategy of daring to allow the enemy character 102 to attack the block square protruding from the magic army 121 with the fireball 131 and make it disappear, or allowing the enemy character 102 to attack the square where the blocks filling the magic army 121 are overlapping with the fireball 131 and eliminate the overlap, the strategic element of the puzzle battle process increases further.

In the heretofore described embodiment, the player having no way of preventing the attack by the enemy character 102 with the fireball 131 during the puzzle battle process, in the event that the fireball 131 comes flying toward the square, among the squares of the magic army 121, already filled with the block, the square inevitably disappears. As opposed to this, it is also acceptable to arrange in such a way that it is possible for the player to move or rotate the falling block 122 by operating the input device 14, cause the falling block 122 to collide with the fireball 131, and prevent the disappearance of the square, among the squares of the magic army 121, already filled with the block.

In this case, as it is possible to not just simply undergo the attack by the enemy character 102 with the fireball 131, but also to defend by means of the player's operation, the player's degree of skill also plays a part against the attack by the enemy character 102, and the strategic element of the puzzle battle process increases further.

In the heretofore described embodiment, the fireball 131 is caused to fly out as the attack by the enemy character 102 during the puzzle battle process, and by causing it to collide, the square among the squares of the magic army 121 already filled with the block is made to disappear. Naturally, the disappearance of the square of the magic army 121 filled with the block can be due to other than this kind of attack by the enemy character 102.

In the heretofore described embodiment, there are four kinds of attribute of the magic which the player character 101 unleashes against the enemy character 102; fire (fire, firer), earth (comet, cometeo), water (blizzard, blizzarer) and thunder (thunder, thunderer), but the attribute of the magic unleashed being selected in advance before the start of the puzzle battle, it does not happen that a change occurs in details of the puzzle battle process in accordance with the attribute of the magic selected. As opposed to this, it is also acceptable to arrange in such a way that the different kinds of magic army are displayed on the display device 15 in accordance not only with the power of the magic selected, but also the attribute.

Also, it is also acceptable that the attribute of the magic unleashed when the squares of the magic army 121 are filled with the block 122 by the puzzle battle process, rather than being decided by the player specifying the magic process before the start of the puzzle battle process, is decided according to the attribute set for the block 122 which fills the magic army 121. For example, it is taken that one of the attributes fire (red), earth (green), water (blue) or thunder (yellow) is set for the block 122 falling from above the magic army 121. It is acceptable that the player, by means of the operation of the input device 14, as far as possible fills the magic army 121 with the block 122 corresponding to the attribute of the magic he or she wishes to unleash and, even in the event that the block 122 of the attribute he or she does not wish to unleash comes down, makes it disappear without filling the squares of the magic army 121.

In this case, the amount by which the enemy character 102's HP 213$a$ are reduced by the magic unleashed when all the squares of the magic army 121 are filled, without the protrusion or overlapping of the blocks occurring, can be calculated by $\alpha \times (Aa \times Ma + Ao \times Mo + As \times Ms) \times R/De$. Herein, although the fact that $\alpha$ is the prescribed constant number, R is the random value which takes the value of the prescribed range, and De is the enemy character 102's defensive strength 217 is the same as in the heretofore described embodiment, it can be taken that Aa, Ao and As are, respectively, an attribute coefficient of the opposite attribute to the attribute of the enemy character 102, an attribute coefficient of an attribute which is neither the opposite nor the same, and an attribute coefficient of the same attribute (Aa>Ao>As), while Ma, Mo and Ms are, respectively, a quantity of squares filled with the block of the opposite attribute to the attribute of the enemy character 102, the block of neither the opposite nor the same attribute, and the block of the same attribute.

In this case, without being limited to just simply filling the squares of the magic army 121 with the falling blocks 122, the player's choice extends as far as deciding the block 122 endowed with which attribute to fill with. Also, as the difference occurs in the effectiveness of the magic unleashed depending on the selection of the block filling the square of the magic army 121, a greater difference occurs in the result of the puzzle battle process due to the difference in the players' degree of skill, and the strategic element becomes even higher.

In the heretofore described embodiment, the puzzle battle process starts in the event that the player has selected "magic" as the action of the player character 101 in the battle process, but it is also acceptable that it starts automatically, without depending on the player's selection. Also, it is also acceptable that the battles between the player character 101 and the enemy character 102 are all carried out based solely on the puzzle battle process. In this case, it is possible that the attack by the enemy character 102 against the player character 101 is also carried out by the CPU 11 compiling the puzzle by executing a prescribed thinking routine.

In the heretofore described embodiment, the magic army 121 displayed on the display device 15 during the puzzle battle process is either the magic army 121-1 or the magic army 121-2, depending on the power of the magic selected, but it is acceptable that there are more kinds of magic army than this. It is possible to have one kind of magic army 121, but to change the time limit depending on the power of the magic which the player has selected (the higher the power of the magic, the shorter the time limit). In the modification example shown in FIG. 7, it is also possible to change the amount by which the MP 203*a* are reduced in accordance with the power of the magic which the player has selected (the higher the power of the magic, the faster the reduction of the MP 203*a*). Also, the kinds of block 122 dropped from above the magic army 121 not being limited to the seven kinds shown in FIG. 4B, it is possible to set their shape and kind as desired.

In the heretofore described embodiment, in the event that the block 122 falls below the magic army 121 and disappears, the next block 122 is dropped from above the magic army 121. Naturally, a timing at which the blocks 122 are caused to sequentially appear on the display device 15 not being limited to this, it is also acceptable, for example, to cause the blocks 122 to sequentially appear at a certain time interval fixed in advance. It is also acceptable to cause the timing at which the blocks 122 are caused to sequentially appear on the display device 15 to change at random, at irregular intervals. Also, it also being acceptable to arrange in such a way that it is possible, by means of the player's operation, to cancel a block 122 which is not used to fill the magic army 121, in a case in which the player cancels the block 122 currently being displayed, it is acceptable that the next block 122 is caused to appear immediately. Naturally, whichever timing the timing at which the blocks 122 are caused to sequentially appear is fixed at, it is necessary to set the time limit for completing the magic army 121 longer than a longest among the block 122 appearance time intervals.

In the heretofore described embodiment, the description is given, as an example, of the case in which the invention is applied to the battle with the enemy character 102 started when the player character 101 arrives at the prescribed position on the field in the RPG. However, it is also acceptable that the game to which the invention is applicable is another category of game, such as an ADG, or that it is a game which only carries out the battle between the player character and the enemy character.

In the heretofore described embodiment, the description is given of the case in which the portable telephone shown in FIG. 1 is applied as the terminal device for the player to carry out the RPG including the battle between the player character 101 and the enemy character 102. In connection with this, as long as it includes the same components as those of the portable telephone shown in FIG. 1, it is also acceptable to apply another type of terminal device, such as a video game machine, a general-purpose personal computer, a portable game machine, or a PDA (Personal Digital Assistant).

In the heretofore described embodiment, a description is given of a case in which the game program executed in the portable telephone is downloaded from the server device existing on the network 3, and stored in the ROM 12. In connection with this, it is also possible to provide a portable telephone in which the game program is stored in advance in the ROM 12. Also, in a case in which, for example, it is possible to install a memory card, in which the game program is stored, in the portable telephone, it is also acceptable to store in the relevant memory card and distribute. In addition to these too, it is possible to distribute the game program by various methods, in accordance with the type of terminal device applied as the platform.

What is claimed is:

1. A video game device for executing a game, including a battle between a player character and an enemy character, that progresses in accordance with instructions from a player and displays an image of the game being executed on a display, the video game device comprising:
    a processor;
    a memory;
    a survival capability value storage that stores, in the memory and for each of the player character and the enemy character, a survival capability value which, by being reduced to a prescribed survival impossibility value, entails a defeat in the battle;
    a game execution progressor that, using the processor, progresses the game in a virtual game space and executes the battle between the player character and the enemy character, the battle being carried out between the player character and the enemy character in the virtual game space, the player character executing an attack on the enemy character in the virtual game space during a first implementation of the battle;
    a puzzle frame displayer that, using the processor, displays a puzzle frame including a plurality of squares, the puzzle frame being displayed and filled on the display independently of the virtual game space during a second implementation of the battle;
    a block exposer that, using the processor and while the puzzle frame is being displayed, sequentially displays blocks on the display, each of the blocks including less squares than the puzzle frame;
    a block mover that, using the processor and in accordance with a first an instruction from the player, moves the blocks sequentially displayed by the block exposer for filling the plurality of squares of the puzzle frame;
    an elapsed time timer that, using the processor, times an elapsed time elapsed from one of when the puzzle frame is displayed by the puzzle frame displayer and when a first block of the blocks is displayed by the block exposer; and
    an enemy survival capability value reducer that, using the processor and in accordance with the plurality of squares of the puzzle frame filled with the blocks before the elapsed time is a predetermined time limit, reduces the survival capability value of the enemy character stored in the memory,
    wherein the survival capability value of the enemy character is reduced both in accordance with the plurality of squares of the puzzle frame filled with the blocks before the elapsed time is the predetermined time limit during the second implementation of the battle and when the player character executes the attack against the enemy character during the first implementation of the battle.

2. The video game device according to claim 1, wherein when all of the plurality of squares of the puzzle frame have not been filled with the blocks before the elapsed time is the predetermined time limit, the enemy survival capability value reducer does not reduce the survival capability value of the enemy character.

3. The video game device according to claim 1, wherein when all of the plurality of squares of the puzzle frame have not been filled with the blocks before the elapsed time is the predetermined time limit, the enemy survival capability value reducer decreases a reduction amount of the survival capability value of the enemy character in accordance with the plurality of squares of the puzzle frame which have not been filled.

4. The video game device according to claim 1, further comprising:
    a time limit case player survival capability value reducer that, when all of the plurality of squares of the puzzle frame have not been filled with the blocks before the elapsed time is the predetermined time limit, reduces the survival capability value of the player character stored in the survival capability value storage in accordance with the plurality of squares of the puzzle frame which have not been filled.

5. A video game device for executing a game, including a battle between a player character and an enemy character, that progresses in accordance with instructions from a player and displays an image of the game being executed on a display, comprising:

a processor;

a memory;

a survival capability value storage that stores, in the memory and for each of the player character and the enemy character, a survival capability value which, by being reduced to a prescribed survival impossibility value, entails a defeat in the battle;

an attacking capability value storage that stores, in the memory and for the player character, an attacking capability value which, by being reduced to a prescribed attacking limit value, entails an attack against the enemy character being limited;

a puzzle frame displayer that, using the processor, displays a puzzle frame on the display during an implementation of the battle, the puzzle frame including a plurality of squares;

a block exposer that, using the processor and while the puzzle frame is being displayed on the display, sequentially displays blocks on the display, each of the blocks including less squares than the puzzle frame;

a block mover that, using the processor and in accordance with an instruction from the player, moves the blocks sequentially displayed by the block exposer for filling the plurality of squares of the puzzle frame;

an attacking capability value reducer that, using the processor, sequentially reduces the attacking capability value of the player character, in accordance with an elapsed time elapsed from one of when the puzzle frame is displayed by the puzzle frame displayer and when a first block of the blocks is displayed by the block exposer; and an enemy survival capability value reducer that, using the processor and in accordance with the plurality of squares of the puzzle frame filled with the blocks before the attacking capability value is reduced to the prescribed attacking limit value, reduces the survival capability value of the enemy character stored in the memory.

6. The video game device according to claim 5, wherein when all of the plurality of squares of the puzzle frame have not been filled before the attacking capability value is reduced to the prescribed attacking limit value by the attacking capability value reducer, the enemy survival capability value reducer does not reduce the survival capability value of the enemy character.

7. The video game device according to claim 5, wherein when all of the plurality of squares of the puzzle frame have not been filled with the blocks before the attacking capability value is reduced to the prescribed attacking limit value by the attacking capability value reducer, the enemy survival capability value reducer decreases a reduction amount of the survival capability value of the enemy character in accordance with the plurality of squares of the puzzle frame which have not been filled.

8. The video game device according to claim 5, further comprising:

a player survival capability value reducer that, when all of the plurality of squares of the puzzle frame have not been filled with the blocks before the attacking capability value is reduced to the prescribed attacking limit value by the attacking capability value reducer, reduces the survival capability value of the player character stored in the memory in accordance with the plurality of squares of the relevant puzzle frame which have not been filled.

9. The video game device according to claim 5, further comprising:

an item acquirer that, during an implementation of the game, acquires an item for raising the attacking capability value of the player character; and an attacking capability value raiser that, when the item has been acquired by the item acquirer, implements the item in accordance with a second instruction from the player and raises the attacking capability value of the player character, wherein the attacking capability value raiser, when the puzzle frame is being displayed by the puzzle frame displayer, raises the attacking capability value of the player character in accordance with the second instruction from the player before the attacking capability value is reduced to the prescribed attacking limit value.

10. The video game device according to claim 1, wherein the block mover is configured to move one of the blocks so that some squares of the block fill the plurality of squares of the puzzle frame and other squares of the block protrude from the puzzle frame, and the enemy survival capability value reducer, when the one of the blocks is moved by the block mover so that the other squares protrude from the puzzle frame, reduces the reduction amount of the survival capability value of the enemy character in accordance with the other squares protruding from the puzzle frame.

11. The video game device according to claim 1, wherein the block mover is configured to move one of the blocks so that some squares of the block fill the plurality of squares of the puzzle frame and other squares of the block protrude from the puzzle frame, the video game device further comprising:

a protrusion case player survival capability value reducer that, when the one of the blocks is moved by the block mover so that the other squares protrude from the puzzle frame, reduces the survival capability value of the player character stored in the memory in accordance with the other squares protruding from the puzzle frame.

12. The video game device according to claim 1, wherein the block mover moves the blocks sequentially displayed by the block exposer so that the squares included in the blocks overlap and fill the puzzle frame, and the enemy survival capability value reducer, when the plurality of squares of the blocks overlap and fill the puzzle frame, reduces a reduction amount of the survival capability value of the enemy character in accordance with a number of overlapping squares of the blocks.

13. The video game device according to claim 1, wherein the block mover moves the blocks sequentially displayed by the block exposer so that the squares included in the blocks overlap and fill the puzzle frame, the video game device further comprising:

an overlapping case player survival capability value reducer that, when the plurality of squares of the blocks overlap and fill the puzzle frame, reduces the survival capability value of the player character stored in the memory in accordance with a number of overlapping squares of the blocks.

14. The video game device according to claim 1, wherein
the puzzle frame displayer displays the puzzle frame from among a plurality of puzzle frames, each of the plurality of puzzle frames differing in one of a quantity of the plurality of squares and a combination shape of the plurality of squares, a degree of complexity being fixed by at least one of the quantity of the plurality of squares and the combination shape, and
the enemy survival capability value reducer reduces the survival capability value of the enemy character in accordance with the degree of complexity of the puzzle frame displayed by the puzzle frame displayer.

15. The video game device according to claim 14, further comprising:
a puzzle frame selector that selects the degree of complexity of the puzzle frame to be displayed on the display device in accordance with a second instruction from the player, wherein
the puzzle frame displayer displays the puzzle frame of the degree of complexity selected by the puzzle frame selector on the display.

16. The video game device according to claim 1, further comprising:
an attack method selector that, in accordance with a second instruction from the player, selects an attack method of the player character against the enemy character from among a plurality of attack methods, including a method for the display of the puzzle frame and the movement of the blocks, for reducing the survival capability value of the enemy character in during the first implementation of the battle, wherein
the puzzle frame displayer, when the method for the display of the puzzle frame and the movement of the blocks has been selected as the attack method against the enemy character by the attack method selector, displays the puzzle frame on the display during the second implementation of the battle.

17. The video game device according to claim 1, further comprising:
a block eliminator that, when a prescribed condition is fulfilled when the puzzle frame is being displayed, eliminates at least a part of one of the blocks which has been moved and fills the plurality of squares of the puzzle frame.

18. The video game device according to claim 17, further comprising:
an enemy character actor that, each time a prescribed enemy action condition is fulfilled during the battle, determines an action for the enemy character, including an attack against the player character and an elimination of at least a part of one of the blocks, and causes the enemy character to carry out the action, wherein
the block eliminator, when the elimination of at least the part of the one of the blocks is determined by the enemy character actor as the action for the enemy character, causes at least the part of the one of the blocks filling the plurality of squares of the puzzle frame to disappear as a result of the action of the enemy character.

19. The video game device according to claim 1, wherein
at least one random attribute, from among a plurality of attributes, is appended to each of the blocks sequentially displayed by the block exposer, wherein
the enemy survival capability value reducer reduces the survival capability value of the enemy character stored in the memory in accordance with the attribute appended to the one of the blocks filling the plurality of squares of the puzzle frame.

20. A video game implementation method, which is executed in a computer, for implementing a game, including a battle between a player character and an enemy character, that progresses in accordance with instructions from a player and displays an image of the game being executed on a display, the method comprising:
storing, in a memory and for each of the player character and the enemy character, before the battle starts, a survival capability value which, by being reduced to a prescribed survival impossibility value, entails a defeat in the battle;
progressing, with a processor, the game in a virtual game space and executing the battle between the player character and the enemy character, the battle being carried out between the player character and the enemy character in the virtual game space, the player character executing an attack on the enemy character in the virtual game space during a first implementation of the battle;
displaying, with the processor, a puzzle frame including a plurality of squares, the puzzle frame being displayed and filled on the display independently of the virtual game space during a second implementation of the battle;
sequentially displaying, with the processor and while the puzzle frame is being displayed on the display, blocks on the display, each of the blocks including less squares than the puzzle frame;
moving, with the processor, the blocks displayed on the display for filling the plurality of squares of the puzzle frame in accordance with a first an instruction from the player;
determining, with the processor, an elapsed time elapsed from one of when the puzzle frame is displayed and when a first block of the blocks is displayed; and
reducing, with the processor, the survival capability value of the enemy character stored in the memory in accordance with the plurality of squares of the puzzle frame filled with the blocks before the elapsed time is a predetermined time limit,
wherein the survival capability value of the enemy character is reduced both in accordance with the plurality of squares of the puzzle frame filled with the blocks before the elapsed time is the predetermined time limit during the second implementation of the battle and when the player character executes the attack against the enemy character during the first implementation of the battle.

21. A video game implementation method, which is executed in a computer, for implementing a game, including a battle between a player character and an enemy character, that progresses in accordance with instructions from a player and displays an image of the game being executed on a display, the method comprising:
storing, in a memory and for each of the player character and the enemy character, before the battle starts, a survival capability value which, by being reduced to a prescribed survival impossibility value, entails a defeat in the battle;
storing, in the memory and for the player character, before the battle starts, an attacking capability value which, by being reduced to a prescribed attacking limit value, entails an attack against the enemy character being limited;

displaying, with the processor, a puzzle frame on the display during an implementation of the battle, the puzzle frame including a plurality of squares;

sequentially displaying, with the processor and while the puzzle frame is being displayed, blocks on the display, each of the blocks including less squares than the puzzle frame;

moving, with the processor, the blocks displayed on the display for filling the plurality of squares of the puzzle frame in accordance with an instruction from the player;

sequentially reducing, with the processor, the attacking capability value of the player character stored in the memory in accordance with an elapsed time elapsed from one of when the puzzle frame is displayed and when a first block of the blocks is displayed; and reducing, with the processor, the survival capability value of the enemy character stored in the memory in accordance with the plurality of squares of the puzzle frame filled with the blocks before the attacking capability value is reduced to the prescribed attacking limit value.

* * * * *